United States Patent [19]
Wahl

[11] Patent Number: 5,982,374
[45] Date of Patent: Nov. 9, 1999

[54] VALLIAN/GEOMETRIC HEXAGON OPTING SYMBOLIC TESSERACT V/GHOST

[76] Inventor: Larry E. Wahl, 1301 Mills St. #4, Menlo Park, Calif. 94025-3239

[21] Appl. No.: 08/845,807

[22] Filed: Apr. 30, 1997

[51] Int. Cl.[6] .............................. G03F 3/08; G06T 17/00
[52] U.S. Cl. ........................ 345/419; 345/355; 345/357
[58] Field of Search ................................ 345/418, 423, 345/419, 355, 357

[56] References Cited

U.S. PATENT DOCUMENTS

| | | | |
|---|---|---|---|
| 4,504,236 | 3/1985 | Zellweger | 434/433 |
| 5,268,998 | 12/1993 | Simpson | 345/427 |
| 5,497,451 | 3/1996 | Holmes | 345/420 |
| 5,751,926 | 5/1998 | Kasson et al. | 345/419 |
| 5,760,779 | 6/1995 | Yamashita et al. | 345/421 |

*Primary Examiner*—Abdollah Katbab
*Assistant Examiner*—Tadesse Hailu

[57] ABSTRACT

A computer method for utilizing a Virtual Tesseract, having all the features, and exercising all the potential for multiple movements of objects, conditions, arrays, interphasing and intra-relating on an integer base by simple computer register shifts.

1 Claim, 22 Drawing Sheets

√3

√3

√3

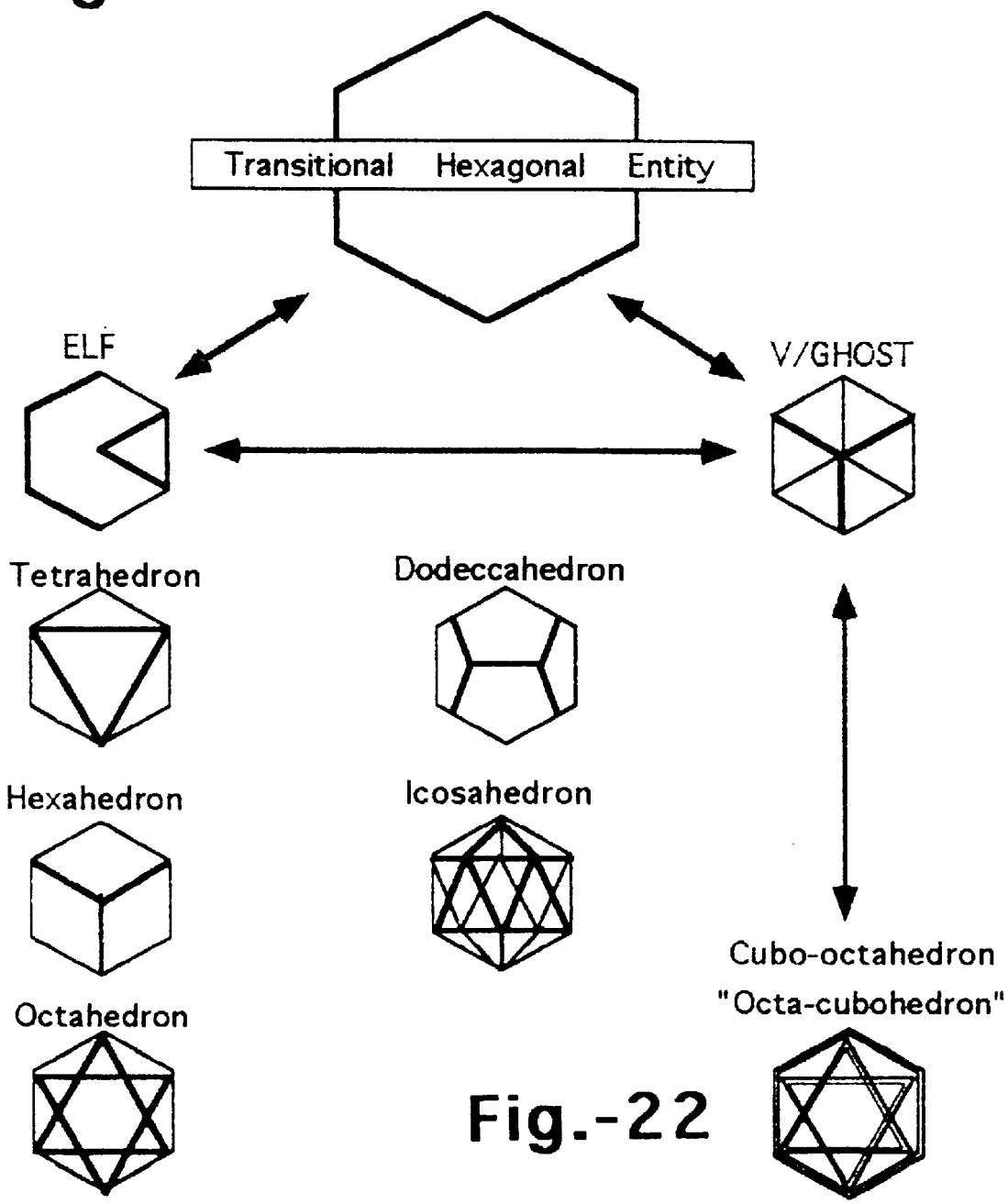

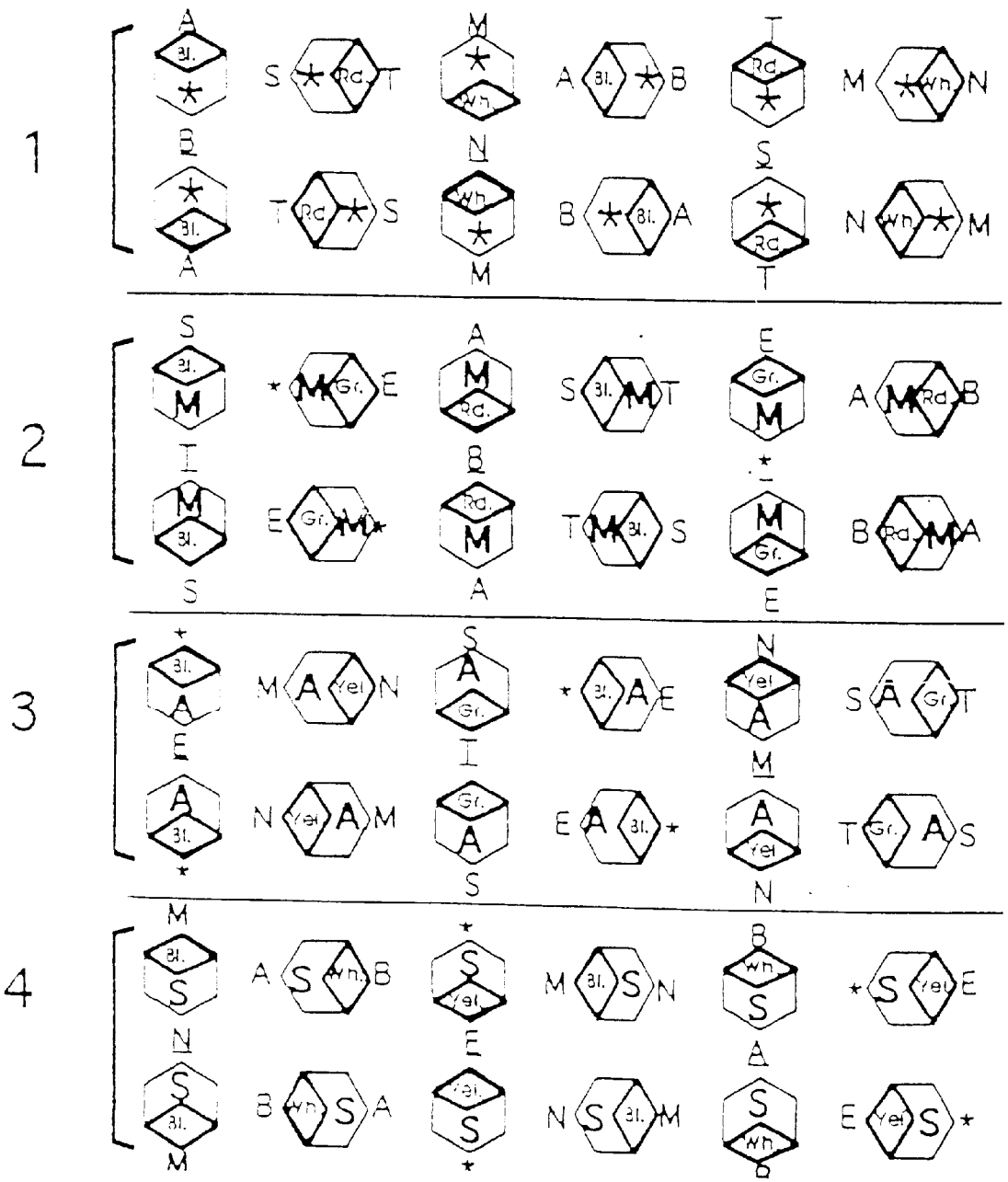

Fig.-29
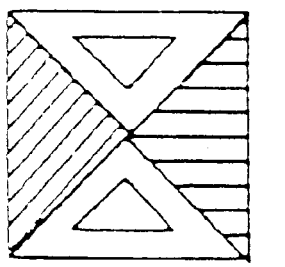
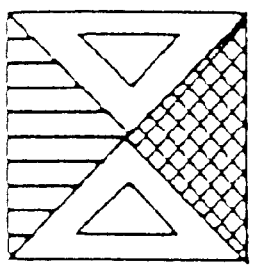
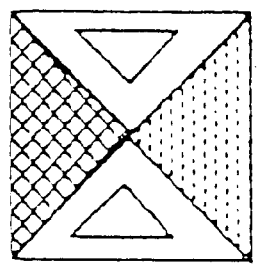
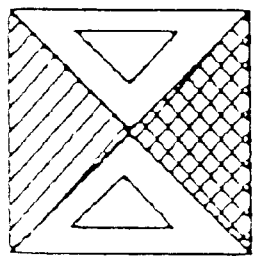
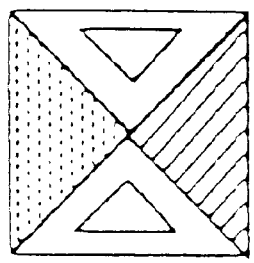
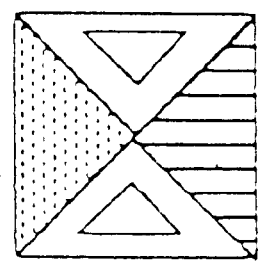
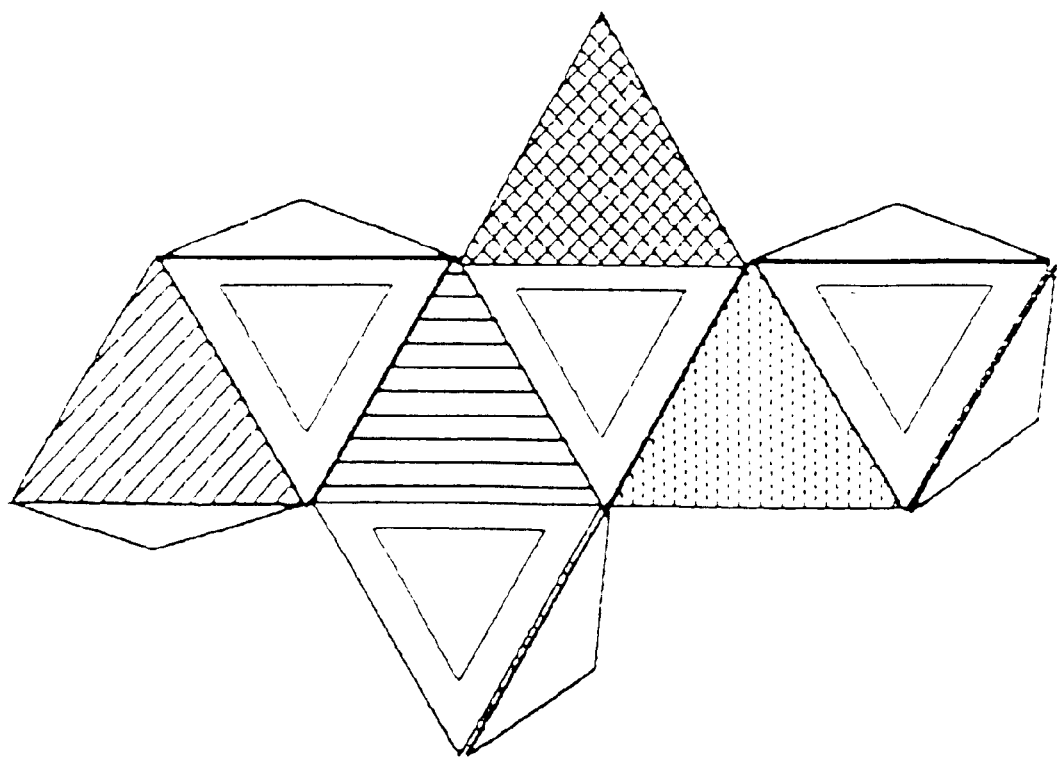

Fig.-33

| Isol md | EditCmd | OrthoCmd | IsoCmd | Ed | Edit md | 15:34 2] |
|---|---|---|---|---|---|---|
| Refr/End Update | | Top View (Plan) | | | Start Surface | |
| Select Plane | | Left View (Bulkhead) | | | Close Surface | |
| | | Right View (Profile) | | | | |
| iScale -1 | | | | | | |
| | | Set Plane X | | | new Line seq. | |
| shift L | | Set Plane Y | | | | |
| ✓Shift R  2 | | Set Plane Z | | | delete Last Line | |
| Shift Up | | | | | del. Last Surface | |
| ✓Shift Dn  2 | | Mirror Up/Down | | | delete all | |
| -Continue Cmd- | | Mirror Right/Left | | | Select Del Line | |
| Table Rot Right | | | | | Select Del Surf | |
| Table Rot Left | | | | | | |
| Tip -- | | | | | Only faceLns 8 | |
| ✓Spin CIkW | | | | | | |
| Rot 30 | | | | | Face -1 | |
| Rot 60 | | Hide down to depth | | | | |
| Rot 90 | | | | | Set Depth | |
| Rot120 | | | | | ISO SetDepth fr. Line | |
| Rot180 | | | | | ISO Move(dup) Surface | |
| ICE/Std/- | | | | | | |

Fig.-34

| Draw/File | Skaff | Skaff | Win.Ed | Bee | Win.Ed | Beezul/Gr | Beezul/Grid | OrthoCmd |
|---|---|---|---|---|---|---|---|---|
| File Load | | SetRegs | | | Ortho Edit | | Refr. Beezul | |
| File Save | | | | | | | Great Circle | |
| Quit | | Show Outline | | | IsoPlane Edit | | Cube On/Off | |
| | | | | | | | ThrustLines | |
| Inputs | | Load as Outline | | | Print Screen  ⌘P | | ✓Beezul Axes | |
| Tutorial | | Save as Outline | | | | | ✓Show Beezul | |
| | | Merge OB to OutL | | | PrScr InvVideo | | | |
| | | | | | Print OB | | Test Sq Patch | |
| | | change to Alpha | | | | | | |
| | | | | | Spin & PrScr | | ✓show grid | |
| | | | | | T.R. & PrScr | | ✓grid on (off) | |
| | | | | | ✓ShowData | | grid 8 | |
| | | | | | PrtSurfs | | ✓grid 2 | |
| CompressOB | | | | | do SolidObject | | grid 1 | |
| Old File Load | | | | | PUT to Clipboard | | | |
| LEAVE U-Edit | | | | | Imagewriter | | Revert(prev.dpth) ⌘R | |
| | | | | | PrtSort | | | |
| Run Cmd File | | | | | Edit "Flat" Iso | | | |
| Immed. End | | | | | | | | |
| CmdFll delay 0 | | | | | | | | |

Fig.-35

Shows the seven Menu items present in the application source code as it now is configured.

<u>Draw/File</u>   <u>Skaff</u>   <u>Win.Ed</u>   <u>Beezul/Grid</u>   <u>Ortho/Cmd</u>   <u>Iso/Cmd</u>   <u>Edit/Cmd</u>

ValIianCmdFile -- Automated Command File(Instructions) (NO COMMAS !)

Command types (M)enu (B)utton (K)ey-down (M)ouse-position (W)ait

```
1   *** 1   1    M = <cr> <fn> = Load File <fn> ---- 1  1  M <cr> SH-3A
2   *** 1   19   M = Force Immediate END applicarion (no re-verify message)
3   *....== Stop processing CmdFile  and  RETURN TO the application
4   *** -------------------------------------------------
5   *** 6   1    M = Refr/End Update
6   *** 6   2    M = Select Plane
7   *** 6   4    M = iScale +1
8   *** 6   5    M = iScale -1
9   *** 6   11   M = Table Rotate *Right*
10  *** 6   12   M = Table Rotate *Left*
11  *** 6   13   M = Tip Forward / Backward
12  *** 6   14   M = Reverse Spin: ClkW/CCW
13  *** 6   15   M = Rotate 30 degrees
14  *** 6   16   M = Rotate 60 degrees
15  *** 6   17   M = Rotate 90 degrees
16  *** 6   18   M = Rotate 120 degrees
17  *** 6   19   M = Rotate 180 degrees
18  *** 6   20   M = Return to */ICE/Std
19  *** -------------------------------------------------
20  *** 3   1    M = Ortho
21  *** 3   3    M = Iso
22  *** 3   5    M = Screen Print
23  *** 3   14   M = WireFrame/Solid
24  *** 4   1    M = Refr. Beezul
25  *** 4   2    M = Great Circle
26  *** 4   3    M = Cube On/Off
27  *** 4   5    M = Beezul Axes
28  *** 4   6    M = Show/Hide Beezul
29  *** -------------------------------------------------
```

Fig.-36

```
 1  *** 5    1  M =  Ortho Top View  (Plan)
 2  *** 5    2  M =  Ortho Left View (Bulkhead)
 3  *** 5    3  M =  Ortho Right View (Profile)
 4  ***  ---------- "Move Control Plane UP/DOWN or click OK." ---
 5  *** 1    0  B =  BUTTON 1 : OK
 6  *** 2    0  B =  BUTTON 2 : Cancel
 7  *** 3    0  B =  BUTTON 3 : UP
 8  *** 4    0  B =  BUTTON 4 : DOWN
 9  ***  ---------- " Select Drawing Surf."  ----------
10  *** 1    0  B =  BUTTON 1 : Cancel
11  *** 2    0  B =  BUTTON 2 : L/Uface
12  *** 3    0  B =  BUTTON 3 : R/Dface
13  *** 4    0  B =  BUTTON 4 : CntlSrf
14  *** ------------------------------------
15  *** 7    1  M =  Start Surface
16  *** 7    2  M =  Close Surface
17  *** 7    4  M =  new Line seq.
18  *** --------- (K)ey-down - types --------------
19  ***********  d  0  K =  toggle *** Surface Grid
20  ***********  d  0  K =  switch to *** Surface Grid (as drawing surface)
21  *** 1    0  K =  "<ctrl> a" -- toggle  "Left"  Surface Grid
22  *** 19   0  K =  "<ctrl> s" -- toggle  "Control"  Surface Grid
23  *** 4    0  K =  "<ctrl> d" -- toggle  "Right"  Surface Grid
24  *** 17   0  K =  "<ctrl> q" --switch to  "Left"  Surface Grid (as drawing surface)
25  *** 23   0  K =  "<ctrl> w" --switch to "Control" Surface Grid (as drawing surface)
26  *** 5    0  K =  "<ctrl> e" --switch to "Right" Surface Grid (as drawing surface)
27  *** ----------- mou(S)e - type ----------
28  *** 75  193  S =  moveto/select mouse Coordinates x =75 / y =193
29  *** ----------- (W)ait-type ----------
30  *** 0    0  W =  Wait 1 second.
31  *** ------------------------------------
```

VALLIAN/GEOMETRIC HEXAGON OPTING SYMBOLIC TESSERACT V/GHOST

BACKGROUND

1. Field of the Invention

This invention is a computer method constructed for graphically and mathematically manipulating a VALLIAN/GEOMETRIC HEXAGON OPTING SYMBOLIC TESSERACT(V/GHOST) in a computer producing alpha-numeric or other input from which all pertinent mathematical and corollary data-base material is indexed and extracted and displayed.

Background

2. Description of Prior Art

An exhaustive survey of the general field of coordinate systems comes down to some form of Rene Descartes' "Cartesian Rectangular Coordinate System". Prior art citations, as searched by a patent expert, produced the following "prior art" with their classes and subclasses:

| * Sutherland (1972), DISPLAY WINDOWING BY CLIPPING, U.S. Pat. No. 3,639,736; | |
|---|---|
| Appl. No.: 878,018; | 235/152, 340/324 A |
| Int. CL | Go6f7/38 |
| Field of Search | 235/152; 340/324 A; 315/18 |

| *Seitz (1973), COMPUTER GRAPHICS MATRIX MULTIPLIER, U.S. Pat. No. 3,763,365 | |
|---|---|
| Appl No.: 219,720 | 235/156, 235/151 |
| Int. CL | Go6f7/39 |
| Field of Search | 235/156, 164, 159, 235/160, 151 |

| *Sutherland, et al (1974), COMPUTER GRAPHICS CLIPPING SYSTEM FOR POLYGONS, U.S. Pat. No. 3,816,726 Assignee: Evans & Sutherland Computer Corp. | |
|---|---|
| Appl No.: 298,084 | 235/152, 235/151 |
| Int. CL | G06f7/38, G06f15/20 |
| Field of Search | 235/151, 152; 340/324.1, 340/172.5; 33/1K; 444/1 |

| *Sutherland (1975), SYSTEM OF POLYGON SORTING BY DISECTION, U.S. Pat. No. 3,889,10 Assignee: Evans & Sutherland Computer Corp. | |
|---|---|
| Appl No.: | 401,479 |
| Related U.S. Application Data Continuation-in-part of serial No. 298,084 (Oct. 16, 1972, U.S. Pat. No. 3,816,726) | 235/152; 235/151 |
| Int.CL | Go6f7/38; Go6f15/20 |
| Field of Search | 235/152, 151; 340/324 A, 340/324 R, 172.5 |

| *Seki Method (1992), METHOD OF DRAWING A CUBIC VIEW U.S. Pat. No. 5,115,494, Method of Drawing a Cubic View Assignee: International Technical Illustration Co., Inc., Osaka, Japan | |
|---|---|
| Appl. No: | 469,763 |
| Filed: | Jan., 26, 1990 |

This application is referential to U.S. patent Ser. No. #07760513, now abandoned. It will consist of non-objected data from the application plus material provided to support a new patent filed, but restricted to a Vallian/Geometric Hexagon Opting Symbolic Tesseract(V/GHOST).

Applicant has attempted to follow a standard format in this patent application. However, due to the slippery nature of many concepts which require simile and metaphor, applicant has finally, had to cover the extensive material with the best arrangement he could possible manage.

This is the third and most formal of the attempts to fashion an acceptable application.

BACKGROUND OF THE INVENTION

Historically, there has been a separation in both mathematical and geometric operation of the orthographic and isometric approaches to visualizing objects in 3 space. Normally, using Cartesian Rectangular Coordinates, multiple orthogonal views are used to assemble two or more pair of vector data in 2-space for translation into axonometric 3-space. Most of the Graphic User Interfaces (GUI) methods suffer degradation in data due to the heavy use of iterative runs of mathematical algorithms using sine and cosine functions, with the resultant creation of permanent or temporary 'shape tables' to augment various views.

In "floating point" format the moment a viewpoint is changed(pixel location)there will be possible rounding errors. Since there are no floating-point pixels, any integer x y screen location will change from view to view. In Cartesian all of these changes must be saved in shape-table descriptors to keep track of real x y, y z, x z, and all other permutations on doubled or tripled, orthographically based sets of sin and cosine mathematical mechanisms. Since all pixel locations are unitized as integers, but the system in which they are currently calibrated is floating point, this makes it obvious that these two systems(integer and floating point) are not connected geometrically but only algebraically.

Because of the restricted precision algorithms used, the views so formed are subject to many kinds of error, most notably rounding error. There are specific look-up tables created for various views, requiring large overhead in computer transfer time and memory space allocations. Additionally, the daunting characteristic of any wire-frame isometric(or any form of axonometric)is that each and every graphic wire-frame view form visually divergent bi-stable views. These two views are 180 degrees apart and will, unbidden, consistantly transform while being observed. Such views are each and severally "Necker Cube Transformations". The operators viewing mind will never settle on one view over another no matter how much time is allowed. The operator will also find that in some positions, or changes in view, "incorrect views" are strongly preferred over proper ones by the human eye, even while the logical mind is understanding it is an incorrect view.

The petitioner accepts this bi-stable characteristic as a mental effect, but takes the logic of Necker Cube "illusions" a further step. If, instead of an illusion, this multiplicity effect is simply an example of phase transition a basic paradigm can be created in which "multiple views form from a single data-base. The Vallian system would see the Cartesian system as the classic example of "Five blind men examining an elephant". The results of the blind mens' tactile examination, where each blind man links an individual part of the elephant as actually being a whole elephant, are incomplete and therefor incorrect as a reliable data-base. The Vallian paradigm requires an integrated GEOMETRIC virtual algorythm to simulate the illusive V/GHOST Tesseract.

The logic behind this is that like the historic metaphor of the "Five Blind Men Examining an Elephant", properly restricted views will easily produce very differing considerations of the singular object viewed, with no change in the object data-base from which it is drawn. A shortened, determined description results in an incomplete data-base. This data-base is properly the "Single Elephant" from which the various views are drawn.

A similar and perhaps more cogent argument for phase transition is seen in the popularity of business and bank cards which use holographic images. Printed on these cards are holograms reflecting various colors at apparently identical locations(two objects cannot exist at the same point). The most imperceptable change in position, either the viewers or the cards will cause a phase change the phase-transition of the color seen at that identical position. Due to the mechanics involved in such a hologram the data-base of potential colors is phase-seperated in the viewers mind, determined only by the slightest change in the relationship between the Point To View and the Point Of View of the holographic image. Viewed outside of the resticted angular views, necessary for illusionary effects, a card will simply be a flat, ordinary object.

The V/GHOST uses a single data-base, like the single elephant, transformed through "holographically" altered "phase transitions" in the source code. The Vallian data-base is designed to restructure all information about a single object into a single data-base, with unitized geometry rather than fragmenting, algebraic abstraction. The desired results are that an elephant's legs', tail, trunk, ears, and/or other selected features are not separated operationally from the geometry of the entire unit. Thus in each operator-determined file, any views of the file are uniquely available for the entire object or subject which exists within that file from any Vallian view. It is obvious that restricting a view to an elephants leg, does not,(in any way)change the data-based elephant. Cutting off the elephant's leg(the equivalent of shape-tables)will of course produce another object. There would now be a three-legged elephant(one data base), and one elephant's leg(a second data-base).

The essential difference between such holographs and the V/GHOST is that while editing and initiating in a hologram are not currently generally available, additional transactions can easily be made in the Vallian V/GHOST, changing or modifying any object or its characteristics. These changes, basically involving integer, register-shift mechanics, are immediately transfered to the date-base, become part of it, and can be available and operational in all other views.

Typically, this can only be done in present systems by floating point transformation of data from one view to another, necessarily producing multiple, exclusive, shape table and look-up structures with constantly changing values for located points, lines, and planes.

The scope of this invention should be determined by the appended claim and its legal equivalents rather than by any examples given. It is clear that the system is basically a data-stream manipulative translator, thus it has obvious potential for massive and parallel data-base manipulations. Primary Examiners Past Considerations on Ser. No. 07760513

A 35 degree 16 minute and 14 second angle is described in both the Wahl application and in the Seki patent. This fact was given 07760513 by the Primary Examiner as indication of similar foundations. However, in Seki by way of Descartes, only an ACTUAL cube is considered. This phisical cube is considered to be a square (an orthographic view) turned 45 degrees, forming a pair of visual, vertically foreshortened rectangles. The resulting, overall horizontal oblong, evenly divided by a central vertical edge, is tipped forward, or backward 35 degrees, 14 minutes, and 16 seconds, resulting in the desired isometric view.

The examiner had section 112, 102–103 arguments against application Ser. No. # 07760513, incomplete disclosure grounds, as well as citing Seki as previous art. The petitioner would respectfully point out petitioners' objections to the Seki citation are that it appears to be based on the mechanics of an Elliptical guide, necessarily structured to fit "in and on" a general standard computer CAD-CAM system already evidense. The Vallian/Geometric Hexagon Opting Symbolic Tesseract "V/GHOST" is a complete stand-alone system, utilized in the present form as a graphics application.

Sheet 04 of 22, FIGS.- 10, 11 show the "Three Vallian business card" format, resulting from the described Vallian rotation, in plane, to 45 degrees, as resulting in a simultaneous rotation in 3 space. Thus the Seki dihedral of 35 degree 14 minutes 16 seconds, orthogonal view is never seen or used in V/GHOST. A minimum 3 vector form of information is developed in every isometric, and orthographic view from three mutually perpendicular squares. Each of these 'squares' (seen as business card models)are connected by their vertices to form a visual "Star of David". This figures' apices are then connected to form the visual hexagon.

Definitions

Terms designated by the inventor and in constant use in this system include:

1. * (STAR) is used to generally name any vector located at ALICE except I.

2. ALICE stands for "Axonometric Logic at IDENTITY CENTER, and EXIT" in the default position.

3. ALPHA POINTS stands for the entire bundle of lines seen as points which penetrate every normal Vallian view, perpendicular to the screen.

4. ALPHA VECTOR is the single bindle of tightly-packed perpendicular lines originating at Alpha.

5. APEX of the Six Pyramiddles (found in the cube) locates where the six triangles meet at the center of the cube, each vertex having an angle of 70 degrees. The internal pyramidal edges are all segments of transhedrals.

6. BEEZUL is a selectable, miniature copy of the visual drawing with changeable indicia surrounding, located in the upper right-hand corner of the VDT screen which indicia act as buttons for standard Vallian movements.

7. DATA-STREAM MANIPULATIVE TRANSLATOR is the description of a process of handling all inputs as locatable on integer "pegs".

8. ELEMENTAL LINE FUNCTION (ELF) is most easily seen as a wire model composed of three equal segments bent at 90 degrees, mutually perpendicular to one another. There are two types: left-handed and right-handed.

9. FIGURE ORDER GRANT SPHERES (FOGS) is a numerical or symbol pointer ambiguously located from the standpoint of "real local objects" which can carry inferential and/or implicitly ordered data about those "objects".

10. LANA stands for Number of Layer At Numbered Address.

11. POWER TRIANGLE is the 30-60-90 triangle which can be manipulated into many other triangular forms.

12. phase transitions allow the locating multiple forms, real, or assumed at the same integer point or points.

13. PYRAMIDDLES consists of any one of six faces of a square which can be considered the base of a four-sided pyramid, the compound angles of each of these four triangular sections being slightly less than 55 degrees (54 degrees 45'45" to a true horizontal).

14. QUADS of Vector Edges are parallel vector lines, or edges, of the cube which include (IM=BT=SA=NE) as x vectors; (IS=BN=MA=TE) as y vectors; and (IB=SN=AE=MT) as z vectors.

15. QUASI-MODAL ELF GEOMETRY is the geometry of visual ambiguity, where one object can be determined by declaration to be a different object with that objects appropriate conditionals, 16. ROLLING PARAMETERS are collections of FOGS single or multiple sub-routines for modifying existing objects, or conditionals.

17. S-A-M-N-B-T-I-E, stands in each letter for the eight vertices of the VALLIAN/QUASI MODAL ELF GEOMETRY cube in initial default position.

18. SPHERICAL CLUSTERS consist of combinations of FOGS data in logical collections for use as randomly, systematically, or objectively related data.

19. SUPPLY SHED stands for a menu area of "objects" which are "True Three Dimensional" virtual object. These will have doubled parameters with sets of vector locators for at least two surfaces of an object imaged to have sides and width(such as gauge of sheets).

20. THE stands for the Transformational Hexagonal Entry.

21. Tool Shed stands for a menu area which supplies "Primitive forms" of geometric shapes for the inclusion of rolling parameters for machine like operations, exclusions, cuts, fills, fillets, beads, welds, bends, etc.

22. Transhedral (TRANS) is the V/GHOST term for the diagonal of the cube, showing the three visible forms in the hexagonal cube as well as hi-lighting the diagonal of the cube, which is seen as a point in the center of the virtual hexagon.

23. Vallian Geeometric Hexagonally Opting Symbolic Tesseract(V/GHOST) represents any non-ambiguous figure that can represent other geometric figures: i.e. hexagon.

24. V&V Vector and Value of a double entry, followed by the third vector and value.

25. V/GHOST stands for Vallia/Geometric Hexagon Opting Symbolic Tesseract.

The Tesseract Basis

It became clear to the applicant, in the WAHL patent application Ser. No. # 07760513, that trying to follow the logic of Vallian programming, which was constantly being up-graded and changed, instead of the logic of special Vallian Geometry which is basic and fundamental was confusing and is counter-intuitive. The applicant could forsee an endless array of Section 112, 102–103 objections to this source-code approach.

The examiners attention is earnestly directed to noting that the 35 degree 14 min. 16 sec. angle, though mentioned in passing, did not and does not function as any operating part of the V/GHOST system. The V/GHOST works on an isometric geometry that represents three simultaneous 45 degree turns of a VIRTUAL cube. The numerical inclusion of 35ø 14'16" does not appear in the Vallian source code, nor in the basic geometry of the V/GHOST. It is understood that Library functions in the CPU will continue to make use of Sin and Cos procedures for line lengths and directions whether the applicant calls for them or not, but the V/GHOST Graphic User Interface uses CALLS to the program of "'I' sin", and "'I' cos", to selectively strip these Library Function calls from the Basic Program and substitute Vallian variables.

The Prime Directive

It is axiomatic, and may even be considered to be the Prime Directive, in Vallian considerations, that the order in which coordinate vectors are entered is vitally important in dictating the manner in which they are displayed and perceived. It does not matter in the Cartesian forms of Coordinate Geometry(which order the user enters the values of X,Y, or Z. They must, of course, maintain their absolute values, but their order is irrelevant. Contrariwise, in the Vallian Geometric Hexagon Opting Symbolic Tesseract, order is not only absolute, but absolutely essential to the proper operation of the system!

The general rule, holding for entering data in Vallian is that the first entered, of two dedicated vector points, describe a Vallian plane, and that any third point will find itself included within the natural limits of that plane".

The first two entries in a "Vallian Triple", describe not only their own specific X,Y,Z absolute locations within their specific vectors, but also, as specific and initial double entries, locate the plane they describe.

Thus, in the order X-Y,-Z, there would be indicated an X-Y plane in Vallian terms, as well as values inherent in entering the specific X and Y. When the Z value is added, the system would have the third necessary input for a total X-Y/Z Triple. If, for example, Z-Y/X inputs were entered (in that order) the plane indicated would be the Z-Y plane. Their specific values would next be included. X (in this case) would be the last vector and value (V&V) included in the Z-Y,- X planes' triple.

In simplest terms, the applications, uniqueness is; "In the order in which values are entered in a Vallian virtual cube". This novel approach and its operation are considered to be what make this system legally describable as a Geometric Hexagon Opting Symbolic Tesseract.

Original 1960 Source Code

The following original 1980 source code was entered on a hand held Radio Shack EL 500. First step was to draw a hexagon on a piece of paper, with X, Y, and Z vectors. The x vector was set to 30 degrees from the center to the right corner of the cube visible in the hexagon in increments of 8 (for convenience). On that hexagon a vector was set from the center to 30 degrees to the left corner for the Y vector, and a vertical line was run from the center to the bottom apice for the Z vector. The points P-1, P-2 and P-3 were approximated and their values entered into the EL 500. Obviously, if it was necessary to change the view of the hexagonal cube, this could only be done mentally, but the following code will show how the most initial and basic swapping process was set up. Needless to say to go from a single view to hundreds with tipping, turning and table rotations calls for a little more sophstication, but basically all of the final code is simply house-keeping of entered values in a Vallian/Geometric Hexagon Opting Symbolic Tesseract, similar to the code following.

The following code block allows for initialization:

```
1 PRINT"Vallian"
4 LET x=0
7 FOR p=1 TO 4
    (Then operating values are set to zero.)
8 LET a=0 :b=0 :c=0 :d=0 :e=0 :f=0 :g=0 :h=0 :i=0 :w=0 :x=0
:y=0:z=0
    (Values are then input as to their X. Y. or Z values with a prefix of
a, b, e, f, g, or i.)
11 INPUT "Data ax= ";x
12 INPUT "Data by= ";y
    (Values are then input as to their X. Y. or Z values with a prefix
identifier of a, b, e, f, g, or i.)
13 a=x :b=y
    (First X value is stored in its prefix bin(a) while a Y value is stored
in its prefix,(b). The program is now ready for filling remaining inputs,
storing selected values in their appropriate prefixes. Data in lines 13, 14,
15, 16; data in lines 17, 18, and 19 show this activity.
14 INPUT "Data ey= ";y
15 INPUT "Data fz= ";z
16 e=y : f=z
17 INPUT "Data gx= ";x
18 INPUT "Data iz= ";z
19 g=x : i=z
    (Values of the prefix bins are compared to see which is higher
(than zero), and the highest value is then passed on, in the blocks 21
through 26 with the passed results printed. If there are no values higher
than zero, then a zerois accepted. Zero is a legitimate value, and location
in Vallian.)
21 IF a >=g THEN x=g:x=a
22 IF b >=e THEN y=e:y=b
23 IF f >=i THEN z=i:z=f
25 PRINT "results are"
26 PRINT "x=";x;"y=";y;"z=";z
    (in line {7} P is incremented and the results are passed to their final
point identifying bins, as j, k, and i.)
40 IF p=1 THEN j=x: k=y :1=z :GOTO 300
50 GOTO 60
    (At line 40, operation is sent to line 300 . Additional bins are
provided for each P pass, with different sets of bin letter identifications:
j, k, l; m, n, o; or t, u, v)
60 IF p=2 THEN m=x :n=y :o=z :GOTO 300
70 GOTO 71
71 IF p =3 THEN t=x :u=y :v=z :GOTO 500
80 GOTO 300
300 PRINT "x=" ;a; "x=" ;g; "y=" ;b; "y=" ;e; "z=" ;f; "z=" ;i
    (At line 300 each individual set of triples qre printed, (in the order
in which they were selectively chosen.)
301 NEXT p
    (Next at 301 P is incremented and the process repeated for a total
of 3.
500 GOTO 501
    (When p value is driven to 4, the program jumps to line 501 which
starts the three stored sets of triples running through the calls for sine
and cosine functions to resolve and print the specific line lengths in terms
of distance from A-B, B-C, and back to C-A. The angles at A, B, and C
are calculated, and the results are printed)
    501 ... (continues with rest of program)
    TESSERACT is the paridigm
    The Tesseract is the basis for all V/GHOST operations. This
entirely "virtual" (multi-dimensional) "object" is obviously unreal,
but assuredly not unusable. Mathematicians have been algebraically
using the Tesseract for decades.
```

The method according to the present invention, can be practiced with a very rapid "ramp up" based on standard, table-drafting, isometric and orthographic techniques. These techniques are generally familiar to those working in and data-intensive field. V/GHOST, being very intuitive, can be easily mastered. The V/GHOST method unlike Seki, is introduced as a self-contained computer program application. It is not subordinated to any other(CAD)system. In general, the system is platform and language independent. Care and attention must be given to programming, but, the programming is not what is being applied for. In this application, the novel Vallian Geometric system being introduced. The utilization of the geometry takes place through a long series of program house-keeping, sub-routines, well known to the industry.

In the V/GHOST a hexagon is projectively seen as a cube by tri-line suppression of every other radii. This process will outline 3 forward, exterior edges of a cube and will support equal line lengths(actually equally foreshortened)each with a declared value of unity.

These lines all turn out to coincide visually with a half the length of each of 4 "diagonals of the cube", giving edge values of ½ √3. This value is complex in floating point, under Cartesian Rectangular Coordinates. In V/GHOST to insure integer form, numbers are multiplied by the raster 2-D x-y screen values and then divided by a selected number of screen points for integer locations. This process sets up a usable point grid framework for the V/GHOST. This process would still result in floating point, real number answers, but dividing the result, of the former multiplied raster 2-D screen values, by the square root of 3, then taking that formula portion and dividing it by itself, will produce unity. The resultant value can then be divided into convenient, cube clone points. Eighty units has been arbitrarily selected, for default convenience along each vector edge. These resulting locatable, mensurable points can then represent Cubic pixel points, Vallian points, or the Identity locations for complete isometric cubes in the V/GHOST.

As a model, the theoretical sticking point, is that the same repressed radius lines representing 'hidden edges', in any isometric view, also represent the opposing diagonals of the hidden faces. These "hidden edges and their appropriate face diagonals must be interpreted to equal the √2(diagonal of a face). Though the program application does not "care" about this problem it must be "taken care of".

Mathematicians have been using formulae to solve equations in n-dimension problems for many years, but geometers have been forced to restrict their practical excursions into the nature of space within a basic tool-box borrowed from the Euclidean world. This has been true of the conventional 3-space universe of Cartesian coordinates when used as a basic Graphic User Interface(GUI)in most computers. As the language difficulties inherent in this application prove, this severely limited geometry has deeply and historically affected the direction, and even the geometric description of the Tesseract.

The Tesseract

Mathematicians have handled the Tesseract "a la Einstein" by inferring dimensions beyond the generally accepted three. The mathematics for the inclusion of n ordered space are simple extensions on already proven formulae. The mathematicians add to x, y, and z, the term C standing for the speed of light, and therefore "space/time, time/space", or the fourth dimension. The mathematical sine and cosine manipulations handling 3-D, are cases in point. Through mathematical algorithms alone, linear mathematicians can manipulate data in 4th, 5th, . . . nth level dimensions, by algebraically adding any number of desired terms as standard variables. When describing these-level figures graphically (these graphics being fed by their mathematical shape tables), the results are always tedious and time consuming and extremely ambigious (FIGS. 1 & 2). Thus, the systems generally available, use only the relative mensuration possible with "wire-frame" objects.

In some dictionaries the Tesseract is defined as
"1. A construct intended to illustrate graphically or in the form of a model the general appearance of a four-dimensional FIG. 2. A hypercube bounded by 8 cubes or cells with 16 vertices, 24 faces and 32 edges." (Funk & Wagnalls New Comprehensive International Dictionary of the English Language, Newark, N.J.: Publishers International Press, 1982, p 1297) Sheet 1 of 24 FIG. 1 shows this generally accepted graphic portrayal.

Considering the dictionary definitions (1) and (2), there appears to be a good deal of leeway in the case of definition (2) as opposed to definition (1).

Many people have seen science demonstrations of virtual Tesseracts produced by arrays of soap bubbles. In these demonstrations, 8 identical bubbles are blown and are arranged by the operator into a cluster. Operationally, there are only 8 bubbles extant, but due to tensor physics and surface-tension mechanics, a relatively well-formed cube will appear in the center of the array. The paradox of this assembly rests on the fact that a cube is thought never to naturally form in a spherical system such as this. Parenthetically, VALLIAN/QUASI MODAL ELF Geometry is clearly shown to originate from a system similar(in numbers) to the "bubble spheres". Since a cube was not actually constructed in the soap bubble model, its incidental inclusion makes it a freak form, or virtual image; hence, graphically it is a form of Tesseract. Generally speaking, equipment necessary to blow soap bubble Tesseracts is not a part of the average mathematicians toolbox. Much more practical for producing the necessary mechanics of the Tesseract is the Cubo-octahedron.

A key learning toy demonstrates the functions of the cubo-octohedron in a constructive model which is then collapsed by manipulation into the "Octa-cubohedron" (Sheet 07 of 22 FIG. 16).

The Vector-Flexor model is manufactured by:

The Da Mert Company

Vern Ct.

San Leandro, Calif. 945577 USA

The Vector-Flexor kit, which is in the form of equal-length sticks and rubber connectors allows the building of numerous polyhedra, including a cubo-octahedron of the type the applicant utilizes. When constructed as a cubo-octahedron, the model will take on numerous shapes when pushed and shoved, (R. Buckminster Fuller called it the "jitterbug" after a dance of the 1940s).

The innate fluid-like instability of the Vector Flexor stops short of total flexability because the eight included triangles remain unalterably stable. Something unexpected happens when any two opposing triangles are pressed toward the center of the array: the six squares, constructed(having no integral strength)all collapse simultaneously into one of two, stable, double-sticked octahedron. The detent form the cubo-octahedron takes, is that of an octahedron(when the cub-octahedron is folded). When opposing triangles of the Vector-Flexor kit are pressed together, the structure simultaneously contracts in all directions, while the un-diagonalized squares collapse into a duplicated triangular mode still composed of the 24 sticks in the original cubo-octahedron, but now as a 6 faced octahedron, with 2 sticks per edge for a total of 12 edges.

Notably this is the same number of edges as are in a cube. It can easily be shown that if a cubo-octahedronal model is formed with 24 equal length sticks and flexible joints between its vertices, 6 squares and 8 equilateral triangles are formed.

Additional Models in Polyhedra

Additional support materials applicant has used include a multi-dimensional sculpture toy called a Polygonzo Synergetics Institute 5-4

Nakajima-cho, Naku-ku,

Hiro-shimo, Japan 730

With this toy is the statement by Yasushi Kajikawi, "that all unstable Archimedian polyhedra can be transformed into Platonic polyhedra and then Fouler transformed into at least one of the only 3 stable forms i.e.. tetrahedron, octahedron or stellate octahedron". Yasushi Kajikawa made these transformations in a purely mathematical process. However, the applicant pursued the establishment of logical rules for a purely geometric order and operation using the 4-D . . . Tesseract as the point of departure.

The defining paradigm for the V/GHOST system is an octahedron seen as a hexagon and considered to be a CUBE with 3-D mechanics of the Tesseract. This actual model octahedron maintains the double-bonded nature of the "cubo-octahedron". Thus, the 6 squares in the cubo-octahedron must be present in the V/GHOST "octa-cubahedron". In the V/GHOST Tesseract model all of these conditions are met.

A Quasi-Modal ELF Geometry is used, based both, on the particular relationship between these two polyhedra and the manipulation of their look-alike, hexagon.

Geometrically it is necessary to handle 3 dimensions before even considering 4-dimensions. Descartes attempted 3-D by altering his 2-D, x, y, coordinate system to include z. He changed Y to Z to express this new dimension, and retained Y with X as perpendicular and essentially horizontal components As a working geometric model, he offered the hexagonally viewed cubic octet. The cubic octagonal figure, by alternate elimination of every other radii will produce an excellent model, one in which x, y, and z are all of equal length(isometric).However, getting these 3 lines to leave the surface of the paper entails finding the diagonals of a cube in order to find a mensurable line for depth.

This problem was solved, by Descartes with the use of sine and cosine functions, thereby, necessarily producing floating point real numbers. Further, in order to differentiate the resulting 8 cube clones in his octet,(so that he could find a center(0.5x , 0.5y, 0.5z) Descartes designated the eight clone cubes in terms of pluses or minuses for conditions of forward/backward, right/left and up/down. For only one cube in the octet, were all the signs positive. In all other clones, one or more minuses were present. Negative square roots were not allowed at the time, so only the forward, right-most, and uppermost, +++cube was allowed.

This process had the disadvantage of losing its center, since that center of a HEXAGON became a point indistinguishable from the front apex, center, or back apex of the DESIRED cube. Descartes was forced to stretch the cube into the rectangular parallelepiped in order to find all 8 vertices. Using opposite pairs of vertices he could again find a center. The results produce the Cartesian RECTANGULAR COORDINATE SYSTEM. Every one dealing with graphics on a computer has been forced to use. Thus, modern systems only have available the same basic geometry in use for 300 years plus.

Quasi-modal ELF Geometry(QMEG)

The new, proposed Quasi-modal ELF Geometry(QMEG) contrarily, may be described as a latent physiological component, for understanding "space" as depth. It is, in artistic terms, the difference between volume(depth) and mass(area); most especially, it is the problem of discerning and describing volumes from masses. Rene' Descartes is considered by the petitioner to be using primitive QMEG when he(Descartes)sets orthogonal views into a system for measuring the 3 dimensional volume of a cube.

Descartes, was acutely aware of the problem of discerning components of mass from components of volume when without a QMEG theoretical base, he set up his hexagonal octet. The octet is an easily produced as a hexagon, with every other radii supressed. It is then divided with two, evenly spaced, vertical, mutually perpendicular cuts parallel to the sides of the visual cube produced, and then a single horizontal cut evenly parallel to the top and bottom. A cubic octet can actually be seen if a transparent plastic cube is hand-held in isometric position and viewed with one eye closed. Under these circumstances, the octet of Descartes will appear as full perspectively pictured clone within such a cube. Thus, proving intuitively, the connection between Descartes' Octet, and the visual mechanics involved in seeing a figure with only a mass(hexagon), visually transformed to a volume(cube), using only a simple "one eye point of view".

The V/GHOST assumes a human 'cone of vision' as the basic paradigm for human visual experience. This conic view has an apex at the pupil of the eye and extends to the circular top and bottom and left and right sides of an object to be viewed. Objects viewed in this manner are within an essentially 30 degree triangular range, with a quasi-circular base, from which most of our visual clues, for determining depth come. From the immediate, unconscious triangulation of these binocular rays from two eyes a set distance apart. Alternatively, decisions of range and location can be made on visual perspective clues located in the observed environment which sense these distances.

All things being equal a small automobile will be seen at some apparent distance away, while a larger version of the same car will be seen as closer. The effective determining of distance between the seer and the seen is generally drawn from x, y and z coordinates which individually or severally do not generally contain specific depth clues. Thus a chair in a doll's house and an identically shaped normal sized chair can appear to be truly identical if the doll chair is closer and the 'real' chair is further away. This works most effectively their mutual backgrounds are kept ambiguous. This resulting scale identification and the manipulation of that scaling is the basis for the effective use of miniature models in movie making, and it is this use of scale which is the 4th dimension in the V/GHOST.

The 80 default positions per vector can stay the same, while the visual display can be doubled. This doubling is indicated by a LANA, (Layer at Number Address). LANA-0 is the default, while the function just described, would be a reduction in size and doubling in scale to LANA (-)1. This results in (½ * ½ * ½), or ⅛ the vector length, and 1/512th the total volume of the former display. A halfing of the display for a LANA of (+)1 would have the 80 points the same, but the displayed material would half the original size. This would give 2 * 2 * 2 or 8 times the vector length values, and 512 times the volume. It should be noted that when a LANA is utilized, the new view is put in a seperate document and tagged to the primary view default from which it was ordered.

Current Tesseract Construction

The general, strictly Euclidean graphical approach, with paper and pencil, is to draw a cube made up of two squares, asymmetrically displaced, which are then connected to one another, producing a quasi cube. Then two similar, but smaller squares are drawn, connected, as a cube, symmetrically, within the first; the vertices of the larger and smaller squares are connected yielding a transparent perspective view of a cube within a cube. The vertices of these two "cubes" are again inter-connected, including those which would be internal to the original drawing. Upon reflection, a complete small cube may be seen nested within a larger. The smaller cube, like the soap-bubble cube, is considered resident in the 4th-dimension, invisible and non-real; therefore, A Tesseract.

If the cells are considered to be tetrahedrons this is the figure of Funk and Wagnall's definition 2.: "A hypercube bounded by 8 cubes or cells with 16 vertices, 24 faces and 32 edges." The V/GHOST System employs this definition, but utilizes only the "cells", of the Funk and Wagnall definition, not the "cubes". This selection will necessarily change the numbers of vertices, faces, and edges to those of the octahedron.

DETAILED DESCRIPTION OF THE INVENTION

The present application has been designed on a Macintosh LC II computer, running on Microsoft Q-Basic. This computer language was chosen for ease of annotating the various lines of source code. The examiner should be aware that a copy of the first and last 25 pages of the source code has been sent to the US. Copyright Office, along with several output screens. This was to demonstrate the underlying heuristic theory and practice of the inventor. In final form, it is anticipated that faster and more efficient computer languages will be used(C/C++) and that a good deal of the source code will be 'driven' into Micro-code on a chip. The less sophisticated language approach was necessary because the system uses 'off the wall' geometry in place of 'off the shelf' mathematics.

The specific source code for the computer program modeling the VALLIAN/QUASI MODAL ELF GEOMETRY system is not the subject of this patent, although a copy of the source code will have been sent to the Copyright Office before this patent is filed. The mechanics which drive the application are fairly simple and straight-forward, but involve incredibly heavy manipulation of house-keeping and strategic code to access a single data-base, through program management, to form the various views. This is true, especially when considering the fundamental driver (½ √3) takes up only three lines of code.

In general the "VALLIAN/QUASI MODAL ELF GEOMETRY" (V/QMEG) computer database is added to by simply drawing (as though on a piece of paper). Currently more than 300 key isometric and orthoganol views are available in any of the various views. All points and all lines, and consequently all objects (whether actual or skaff) will be located automatically by at least 3 point vectors.(Sheet 12 FIG. 18)

Ramifications for Hidden line

Hidden line algorithms are usually quite complex; in the V/GHOST system, they are unusually simple. In the isometric cube, there are three vectors 120 degrees apart representing three 90 degree mutually-perpendicular coordinates. Given that each coordinate is equal to one, in vector mechanics the value of these three, when added and the square root taken, yields the square root of 3 in all such V/GHOST cases. Where 1 (unity) is represented by 80 divisions in each vector direction, the added totals will be 240. The square root of 240 is 15.4919 . . . , the square root portion of this operation does not have to be performed. It is enough to know that Alpha is the sum, arriving at x=80, y=80, and z=80.

Thus, the mathematical proof of which lines will be printed and which will be hidden is arrived at by simple addition of the vector values of the competing points. In the default case of S-A-M-N-B-T-I-E, the lower total value of a coordinate vector sum indicates that the point (and the object to which it is attached) is closer to the user and therefore printed first. If a transparent section, such as a window, is located on a plane, the plane directly behind the window will be the one which will have the next higher sum of vectors, and therefore will be seen and printed. Since infinite layers are located numerically behind one another on some perpendicular vector, and since the views are always paraline, which object that will be in front of another object is simply a matter of mechanically determining which points are closer (numerically smaller) and which are further (numerically larger) from the specific Point of View (POV) from ALICE. In somewhat similar fashion, even orthographic views can be stacked. By altering the two-vector plane the drawing is on, and by making previous or subsequent planes transparent, the user can perceive as many or few layers as desired.

The Meaning of Virtual

In the V/GHOST, theoretically, not even an actual cube is used, but rather the figure of the octahedron is chosen as a primary model, outlined as a hexagon, which is then transformed by DECLARATION into a cube. In this octahedron, which itself has been developed from the cubo-octahedron, it can be shown that there exist 3 square mutually perpendicular planes at the center of the figure. These planes are the bases for ANY two, triangular, four-sided regular, pyramids. A unique top and a bottom pyramid are connected to every one of these six square bases. This is true because the apex angle for each pyramid is 90 degrees.

Thus, as the octahedron is turned to various positions, edges of the pyramids automatically become visually transformed into edges of bases, and vice versa.

THE HEXAGON AS VIRTUAL CUBE

For the V/GHOST purposes, and strictly because of human experience, a hexagon is seen as what it normally is ... a 2-D polygon. If it has straight lines radiating from its center to its six vertex points, it is normally, still seen as 2-D. But, if every other radii is suppressed, a virtual cube explodes from the paper with a definitive and insistent cubic view.

This isometrically viewed cube will clearly have "forward" edges which mark x, y, and z vectors. Considering such a cube to have edges of 1 unit, makes it possible to see 3 of the 4 "diagonals of a transparent cube". These 3 diagonals, include a natural fourth, seen as a point, with a lenbth equal the SQRT of 3 ($\sqrt{3}$). Adding a specific scalar to the 1 unit, cube edge, will allow that 1 to equal one inch, one mile, one hundred miles, one micron, etc. Anything infinitely large or small can be measured with this system.

By relating this figurative geometry(Quasi-Modal Geometry) to the linear mathematics it is necessary to program essentially visual analogs of 3 space into computer digital displays on 2 space display screens. The process necessitates using a GUI(Graphics User Interface)to coordinate and locate the specific 3-D analog points onto digital 2-D screen pixels. In Cartesian procedure, real, but floating point numbers will result from any two orthogonal views, making it necessary to provide co-processors, floating point capable, for attempting to locate pixel x,y point locations, which, in themselves are not described in floating point, but rather in definitive x-y integer numbers.

It will be shown that V/GHOST works primarily with integer numbers, producing no rounding errors. Although necessary V/GHOST functions call for the $\sqrt{3/2}$, these answers are multiplied by the x and y pixel locations and then divided by the same result to form a generalized value of 1 as the value of the side of a cube. The system essentially deals with the power of the 30-60-90 triangle bisecting a "business card" rectangle as its diagonal. The opposite sides of such triangles are one half the hypotenuse of the complimentary triangles. This being true, native computer functions for resulting multiplication's and/or divisions, are simple and machine rapid, register shifts.

Generalized Mathematical Considerations

The fortress position for mathematics has always been the generalization of a mathematical engine primarily relying on formulae. The nature of this engine is that once learned and memorized, it is available for regular variable input and will unassailably produce verifiable, reliable following output.

The various systems of coordinate geometry, on the other hand, attempt to deal not with abstract symbols but rather with the virtual existence of those manipulatable symbols in the "real world". The linear and abstract mathematician can put together a "tool box" of reliable devices which never fail him. However, some of these formulae can express equations provable by the form, but impossible of translation into that real world. The geometers, dealing with such "objects", must follow a more intuitively substantial and basic set of mechanics. It is this set of basic mechanics which will be used by the petitioner to demonstrate the Vallian V/GHOST system. This produces a dichotomy, but not necessarily an unsolvable paradox for the linear mathematician. In fact, that mathematician, now will have an observable, repeatable, completely scientific, geometric methodology to add to his choice of tools.

Additional Mathematical Considerations

Mathematicians have been using formulae to solve equations in n-dimensions for many years, but geometers have been forced to restrict their practical excursions into the nature of space within a basic tool-box borrowed from the Euclidean world. This has been true of the conventional 3-space universe of Cartesian coordinates when used as a basic Graphic User Interface(GUI)in most computers. As this application will prove, this limited approach has deeply and historically affected the direction, and even the geometric description of the Tesseract.

The central theme and paradigm of the VALLIAN/ GENERAL HEXAGONALLY ORDERED SYMBOLIC TESSERACT(V/GHOST) is not the abstract construction of proposed objects in space(though this is done without the normal, considerable cost in time and computer space), but is, instead, nothing less than the delineation of supporting space itself. Above all, such a space must be defensible. "Defensible space" is defined in Vallian, properly and completely, as a declared cube: ineluctable, mathematically definitive, fully extensible, and articulate. Into this matrix will be locked virtually anything that can be conceived. This perfect cube will fit in a perfect sphere, geometrically and mathematically, coordinating all general space geometry. Thus the application is based on the construct that objects are seen as having depth only because the human eye is constructed to make use of various cues in/on those objects that produce the effect of 3-D space.

One of the many tools available to general and linear mathematicians is the ability to substitute values, one for another. But, as long as geometric manipulation is limited to a planar view for individual geometric objects, these objects must be taken literally at "face value". In other words, they must be seen as they are drawn as orthogonal objects. This logic flies in the face of human experience, which is full of 3-dimensions routinely and n-dimensions increasingly.

Assuming this to be true. should make it possible to design a system that will allow the computer to "see" 3-D., in much the same manner as the human eye. Persons whose vision is limited to monocular form can still be aware of depth by use of linear and aerial perspective (and, of course, experience). The component they are missing is binocular (triangulated) 3-D viewing. While the computer screen is limited to 2 dimensions as a raster for pictorial material, much the same could be said for the retina of the human eye. It is how material is presented that determines what is 'seen'.

All things being equal a small automobile will be seen at some apparent distance away, while a larger version of the same car will be seen as closer. The effective determining of distance between the seer and the seen is generally drawn from x, y and z coordinates which individually or severally do not generally contain specific depth clues. Thus a chair in a doll's house and an identically shaped normal sized chair can appear to be identical if the doll chair is closer and the 'real' chair is further away, as long as their mutual backgrounds are kept ambiguous. This scale identification and the manipulation of that scaling is the basis for the effective use of miniature models in movie making, and it is this use of scale which is the 4th dimension in the V/GHOST.

BRIEF DESCRIPTIONS OF THE DRAWINGS

FIG. 1. shows the normal view of a "standard" Tesseract or Hypercube.

FIG. 2. shows the internal cube or the actual Tesseract.

FIG. 3. shows the Hexagon-Based Vallian Axonometric Symbolic Tesseract.

FIG. 4. shows two equal circles arranged vertically with the center of C-1 intercepting the circumference of C-2, forming a Vesica Pisces.

FIG. 5 Shows the Vesica Pisces transformed into the duel equilateral triangles.

FIG. 6. Shows the figure of an equilateral triangle, possible for the ELF.

FIG. 7. Shows the ELF in equilateral position but having 90 degree angles.

FIG. 8. Shows the Triangle of FIG. 6 in isosceles position

FIG. 8a. Shows the Triangle of FIG. 6 in 90 degree right angled position.

FIG. 9 Shows the ELF of FIG. 7 in "V" position.

FIG. 9a. Shows the ELF of FIG. 7 in "half-hex" position.

Shows a series of 3 squares superimposed on one another, with individual diagonals.

FIG. 10.

Is a view of three squares: A - B, B - D, D - C ,C - A, as the top, with A' - B', B'- D, D'- C',C'- A', and A"- B", "B - D", "D - C"','C -A", stacked directly below one another. There is a horizontal center-line ¢—¢.

FIG. 11

Is a view of three squares of FIG. 10, turned 45 degrees to a perpendicular seen as a point. There is a horizontal center-line ¢—¢.

FIG. 12. Shows the orthogonal hexagon with radii drawn to the apices.

FIG. 13. Shows the orthogonal hexagon with every other radii drawn.

FIG. 13a. Shows the orthogonal lightly drawn square whose vertices reach the circumference of a circle. Inside this square is another darker circle drawn and turned 45 degrees to the first FIG. 13b. Shows a circle with a heavily drawn smaller square drawn within the first square circumscribed by a second inner circle. A double arrow shows opposing vertical vectors.

FIG. 13c. Shows the figure of 13b turned clockwise 60 degrees. The vertical double arrow shows opposing vectors at 30 degrees below, left and 30 degrees above, right to the horizontal.

FIG. 13d. Shows the figure of 13c turned clockwise an additional 60 degrees. The vertical double arrow now shows opposing vectors at 30 degrees above, left and 30 degrees below, right to the horizontal.

Shows the key Vallian reference drawing as a "Rosetta Stone" of multiply observable Vallian angles.

FIG. 15. shows a highly diagrammatic view of a cubo-octahedron.

FIG. 16. shows a highly diagrammatic view of a octa-cubohedron.

FIG. 17. shows the combining of the three 60 degree rotated "oblong, squares", into a Star of David, fitting perfectly into the hexagon.

FIG. 18. shows the 6 turned squares, numbered to emphasize their general shapes and positions along with the eight included triangles.

FIG. 19. shows the SAMNBTIE exterior cube, with the interior samnbtie octagon(Tesseract).

FIG. 20. shows the SAMNBTIE exterior cube, with the interior samnbtie octagon(Tesseract)all as VIRTUAL objects. Emphasized at s-a,a-t,t-b.b-s in the smaller hexagon, as well as S-A,A-T,T-B. T-B. and B-S in the larger hexagon are two squares posing as "business card shapes"

FIG. 21. shows the THE (Transitional Hexagonal Entity "cube" outlined as 8 variously hexagonally visualized, catalogued "objects".

FIG. 22. shows the composite multiple figure included in the V/GHOST.

FIG. 23. Shows a programmers view of the geometry and Math Analysis of Entry of material into the V/GHOST system.

FIG. 24. is a programmers isolated view of the Z axis the of Entry.

FIG. 25 a programmers Display view of the detail of the X, Y, Z locations and Analysis of Display in the V/GHOST system.

FIG. 26 is a programmers Display view of the detail of the X, Y, Z locations and Math Analysis of Display rotated right 90 degrees from FIG. 25 in the V/GHOST system.

FIG. 27 Shows the first 48 positions of the V/GHOST cube Spin Rotations.

FIG. 28 Shows the second 48 positions of the V/GHOSY cube Spin Rotations.

FIG. 29 Shows 6 orthogonal views of a mid-apex-centered octahedron. Below these six figures is the stretch-out of that octahedron.

FIG. 30 Shows the pictorial output of a Vallian programmed object. It is a small octahedron seen as a hexagonal cube. This figure is within a larger hexagonal "cube". Four, three-railed objects outline a base. In the same drawing four parallel lines extend from A-S, four perpendicular lines extend from S-I, and four lines run vertically from I-B.

FIG. 31 Shows the drawing of FIG. 30 rotated right 30 degrees shows the a 3-rail base with an exterior-edged ELF outlined in 1 four,(X vector) and 2 four(Y and Z vector) edges, spin-rotated 30 degrees from FIG. 30 to a Flat-up format, to produce a right control surface at A-I-T-N.

FIG. 32 shows a centrally located computer output of a Vallian application as a Star-of-David, within a larger Star of David(actually Star-Tetrahedrons). On the left is a first set of numbers representing data-file headers, followed by the first of triple-data-base set. On the right side of the FIG. 32 is a continuing set of points which make up the complete database for this drawn object.

FIG. 33 Shows the first three menus at the top of the Vallian application output screen.

FIG. 34 Shows the remaining four menus, reading from left to right at the top of the Vallian application output screen.

Sheet 19 of 22

FIG. 35 Shows in an automated command form, the menus presently available, and the codes for accessing them.

Sheet 20 of 22

FIG. 36 Shows the continuing command form for the menu selection.

Sheet 21 of 22

Figure 37:
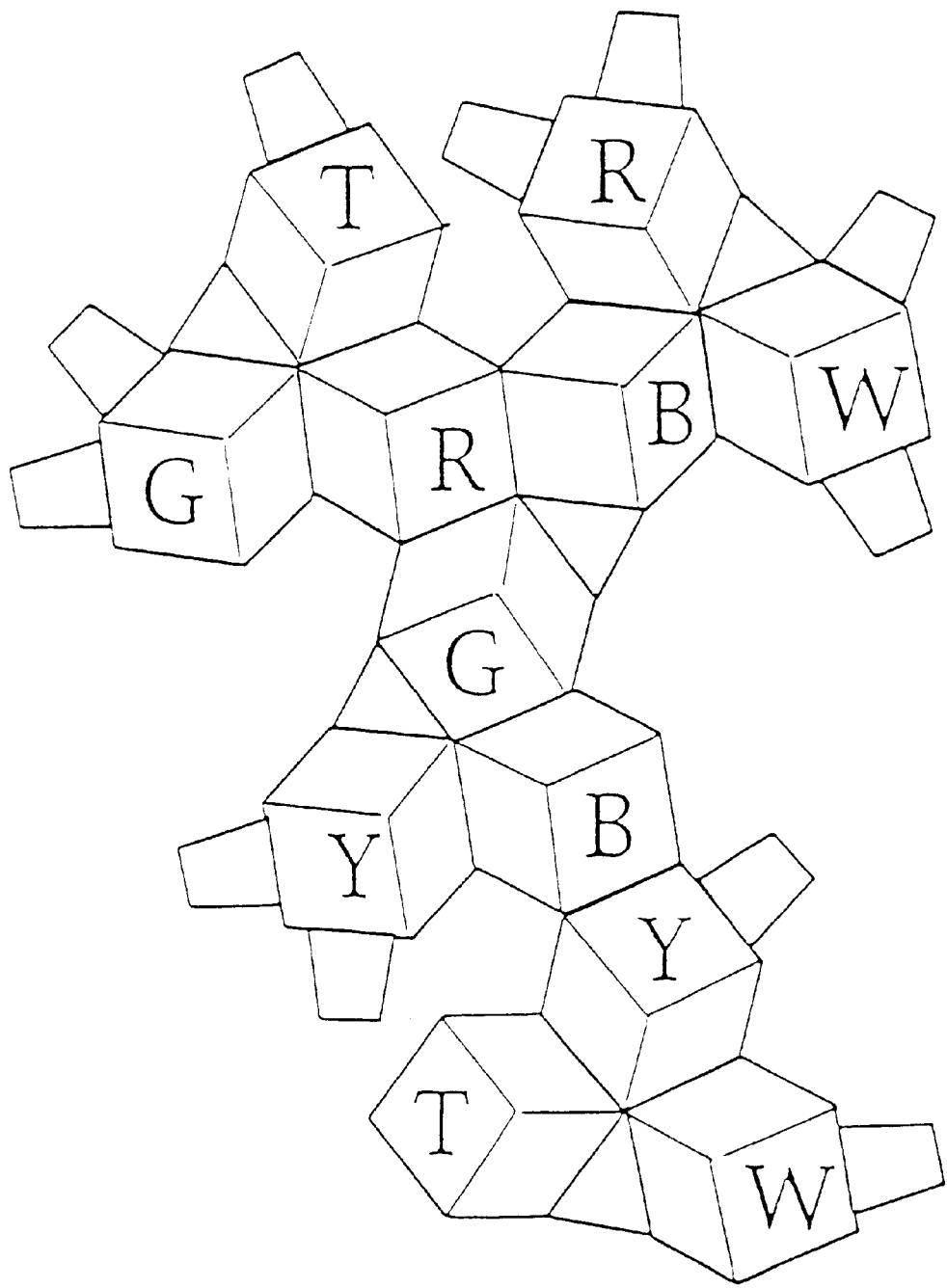

FIG. 37 Shows a stretch out view of a do-decca-hedron, with doubled letters representing the six colors of the cube faces, i.e.. White, Blue, Red, Yellow, Green, and Tan.

Sheet 22 of 22

FIGS. 38.A, B, C, D, E

Shows a Vallian Actual Object(VOB) view of a series of a do-deccahedron, representing a 3-D object acting as Figure Order Grant Sphere of data-base auxiliary data and command lines.

DETAILED DESCRIPTIONS OF THE DRAWINGS

Sheet 1 of 22

Figure 1:
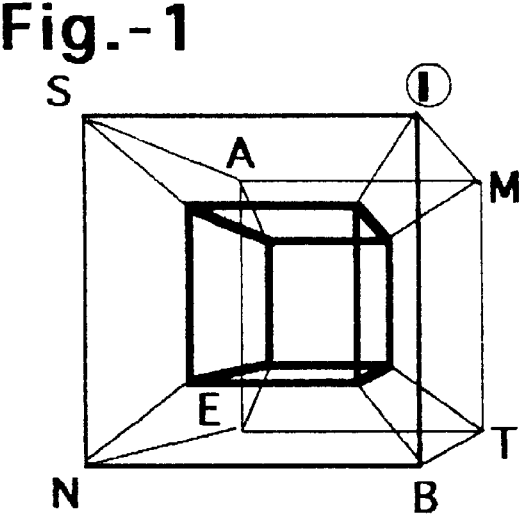

FIG. 1 shows the outer cube described by the letters S-I-B-N-A-E-M-T. Within this larger cube, there is a smaller cube abstracted in FIG. 2, described by the letters Si-Ii-Ni-Bi, Ai-Mi-Ti-Ei, which is part of the entire assembly which makes up the imagined Tesseract.

The Tesseract is considered to exist in N-dimensions, and as such is considered impossible of graphic representation. FIG. 1 on Sheet 01 of 22 is the generally accepted view of this figure as it is thought of. The main thing that this drawing will show, is that the figure has the necessary planes, edges and points which are considered to be a logical part of this illogical object.

In some dictionaries the Tesseract is defined as

1. A construct intended to illustrate graphically or in the form of a model the general appearance of a four-dimensional FIG. 2. A Hypercube bounded by 8 cubes or cells with 16 vertices, 24 faces and 32 edges." (Funk & Wagnalls New Comprehensive International Dictionary of the English Language, Newark, N.J.: Publishers International Press, 1982, p 1297) REF-Sheet 2, FIGS. 2,3.

Considering the dictionary definitions (1) and (2), there appears to be a good deal of leeway in the case of definition (2) as opposed to definition (1). Many people have seen science demonstrations of virtual Tesseracts produced by arrays of soap bubbles. In these demonstrations, 8 identical bubbles are blown and are arranged by the operator into a cluster. Operationally, then, there are only 8 bubbles extant, but due to tensor physics and surface-tension mechanics, a relatively perfectly-formed cube will appear in the center of the array. The paradox of this assembly rests on the fact that a cube is thought never to naturally form in a spherical system such as this. Parenthetically, the VALLIA/GEOMETRIC HEXAGON OPTING SYMBOLIC TESSERACT(V/GHOST)is clearly shown to originate from a system similar(in numbers) to the "bubble spheres". Since a cube was not actually constructed, in the soap bubble model, its incidental inclusion makes it a freak form, or virtual image; hence, graphically it is a Tesseract. Needless to say, equipment necessary to blow soap bubble Tesseracts is not a part of the average mathematicians toolbox.

Figure 2:
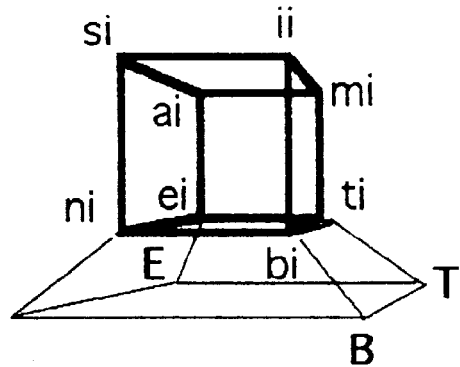

FIG. 2 shows an isolation drawing that is a simplified view of the interior Tesseract. This would be the object in the center of the larger cube. Classically, this inner cube would be the Tesseract, while the larger cube, enclosing it would be the "bubbles" which control and make it visible. From a practical point of view, the drawing of FIG. 1 is both difficult to understand, and more importantly, impossible to easily mensurate.

In FIG. 2 however some portions are made simpler. Lines ni-N, N-B,B-T,T-E, and E-N with their oblique connectors form a skirt with four extra oblique faces ni-ei,ei-E,E-N;its opposite oblique face ti-T,T-B,B-bi,bi-ti. A similar skirt can be seen in FIG. 1 at the top of the combined cubes, and then four connecting verticals, S-N,A-E, M-T, and I-B would be added.

Figure 3:
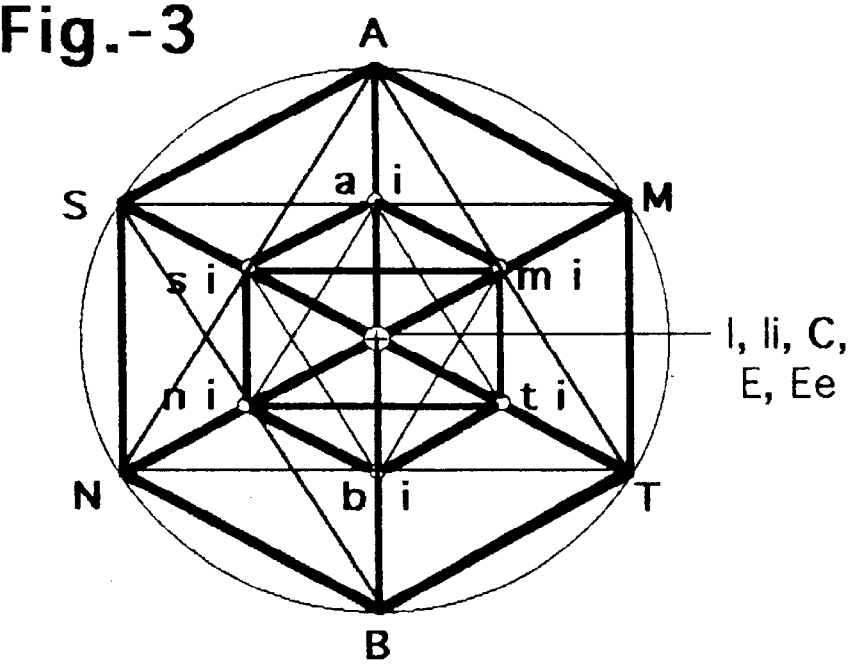

FIG. 3 This inclusion of the "Vallian Tesseract" and a model of the forces or objects creating it, has been formalized and made measurable by the use of the V/GHOST system in which the octagon is utilized to create a formal model which will make the Tesseract as close to being visible as is possible, but more importantly will allow us to use it in a practical manner as provable as the linear and algebraic mathematical uses that are made of it in dealing with N-dimensions.

Thus, FIG. 3 is considered to be a hexagon inscribed in a circle, giving the use of radial lines all measurable as equal radii of the circle. Since this is so, it means that the connecting lines, S-A A-M M-T T-B B-N, and N-S are all equal to one another and to the included radii of the circle whose center is located at C.

Within the larger octagon (S-A-M-N-B-T-I-C-E)is a smaller octagon (Ai-Mi-Ti-Bi-Ni-Si), which has edges C-Mi, plus five similar radii, just half the length C-M.

Thus, by declaration alone, it is possible to see both the larger and smaller octagons as transparent cubes, seen in an isometric view, totally within a Sphere. Taking this into consideration will mean that something must be done with the position C, which has now become ambiguous. Ambiguity is not allowed in a usable coordinate system where every sine and node, apex and edge, angle and face must be accurately located.

As a consequence in FIG. 3, the position C will be an impossible 2-D location for the near-front apex of the large cube, so it is lettered as I(identity point), Ii becomes the near-front apex of the smaller cube, And, the same point C, of course, becomes the composite simultaneous center of the complete array, including the circle seen both as a circle, and as a sphere. Ee, still at the same point then becomes the far-back corner of the smaller cube, and E is the far-back apex of the larger cube.

Thus, the smaller cube has the general appearance of a clone, ⅛ the volume of the larger cube. This fits perfectly, as a model, with the Cartesian octet. It would indicate that the smaller cube relates directly to the single clone upon which the Cartesian system is based. Descartes, for various reasons, used only the upper, right-most, and forward-most cube of the octet, and ignored the other seven.

Thus, FIG. 3 is declared in its entirety to be a legitimate, operable model of A Hypercube bounded by 8 cubes or cells with 16 vertices, 24 faces and 32 edges."

Sheet 2 of 22

Figure 4:
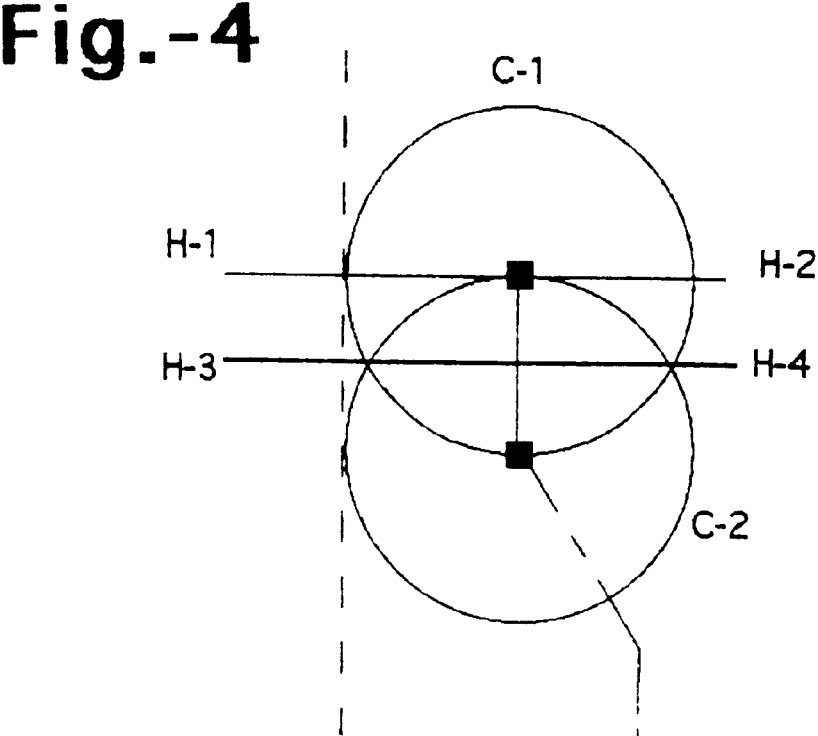

FIG. 4. shows two equal circles C-1 and C-2. with C-1 intercepting the circumference of C-2. These two circles are arranged vertically in respect to one another, with a horizontal line H-1, H-2 having a parallel line (H-3, H-4) below it drawn through the intersections of the two circles. This line intercepts two ends of the Vesica Pisces with the arcs swung from the two centers.

Figure 5:
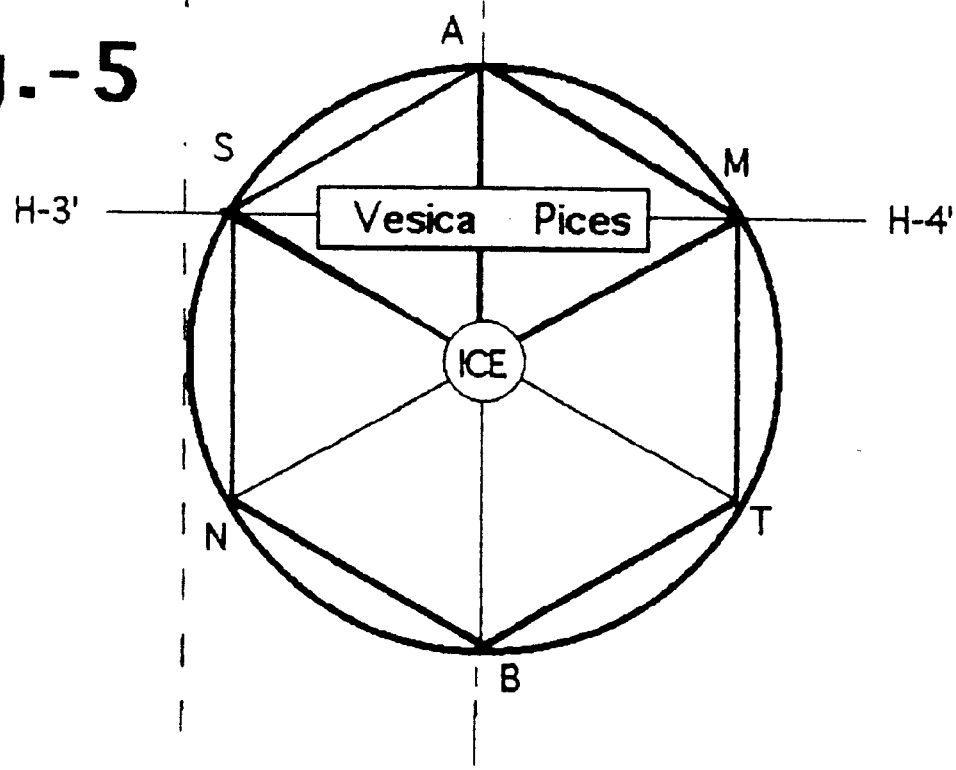

If in FIG. 5 the various intersections are named S, A, M, and I, and lines drawn connecting these points, the Vesica Pisces will transform into the parallelepiped SAMI. A vertical line drawn from A to I will divide the parallelepiped into two equilateral triangles, and these will be two of the six equilateral triangles which make up the octagonal figure SAMNBT with its six radii. The proceeding will show that the equilateral triangle is a natural consequence of circular operations, which triangles naturally complete the key hexagonal figure.

In dealing with the resulting octagon, it is clear that it is composed of six equilateral triangles. Suppression, in any order, of very other radii will allow each set of two triangles to form a quadrilateral which outlines 3 faces seen in isometric.

Sheet 3 of 22

Figure 6:
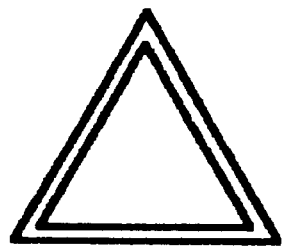

FIG. 6 Shows the figure of an equilateral triangle, which is also a possible visual descriptor of an ELF.

Figure 7:
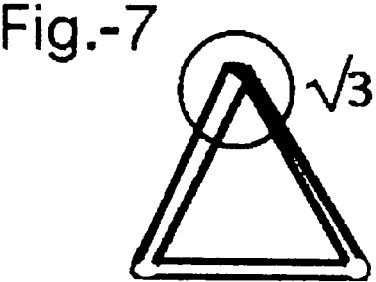

FIG. 7 Shows an ELF in "equilateral position" and logically comprised only of two 90 degree angles and three 3-dimensional edges, all mutually perpendicular to one another.

Figure 8:
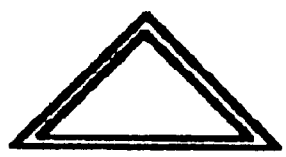

FIG. 8. Shows the Triangle of FIG. 6 in isosceles position. This could be a view of FIG. 6 with its top apex back or forward relative to the screen location of its base, but though possibly seen in 3-space, it would still be on a single plane.

Figure 8A:
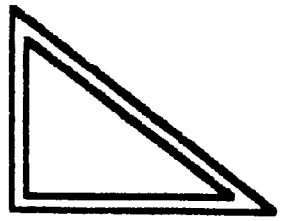

FIG. 8a. By manipulation the triangle of Fig. could be manipulated in 3 space to become a 90 degree right angled triangle, (visually in three space), while it would still be only a two dimensional figure.

Figure 9:
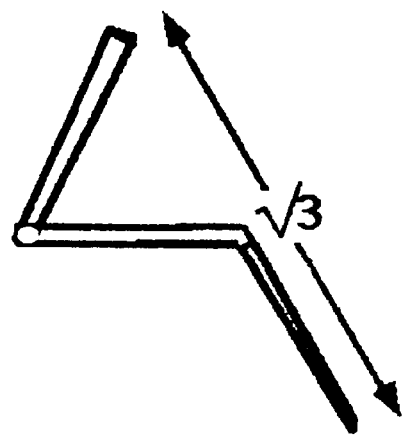

FIG. 9 Shows the ELF of FIG. 7 in one of its three possible types of Vallian positions i.e. :Equilateral; V-form; or 1/1/2 hex. Here, it is in the "V", position.

Figure 9A:
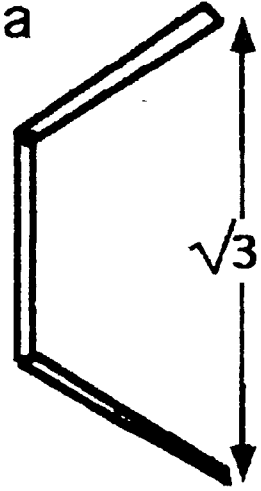

FIG. 9a. Shows the ELF of FIG. 7 in "half-hex" position. The obvious form "seen" is a clear half a hexagon, but failing the perspective drawing shown here, it would be impossible to tell if the upper or lower end were nearer the observer. Also shown is the √3 from one end of the ELF to the other. This length of √3 is present in every ELF because the edges are mutually perpendicular in any Vallian view, and the connections of their ends corresponds to the diagonal of a cube. This is true in FIGS.-7, 9, and 9a.

The ELF can be described as a wire-model of 3 equal lengths, bent to mutually perpendicular angles. The entire V/GHOST can be considered to be made up of these primitive 3-D objects, although it is impossible to tell where they start or where they end, simply that they do. There are two general classes of ELFs; type one are right-handed, and type two are left-handed. This determination is made because after the first bend in the wire has been made(as a 90 degree angle) the next 90 degree angle bend can be made by one of two bends, 180 degrees apart. ELFs stands for Elemental Line Function, and in an actual constructed model of a cube, can be constructed of 4 right-handed ELFs, 4 left-handed ELFs, or 2 right-handed and 2 left-handed ELFs.

It is impossible to tell in operation whether an ELF is a left-handed or right-handed. This ambiguity is present in all ELFs, and is the reason that they are considered to be totally ubiquitous. There is no multi-dimensional figure in Vallian without them, but all that can be taken for granted is that they are multi-dimensional figures, producing multiple, legitimate, geometric shapes, forms and "objects".

Sheet 4 of 22

Figure 10:
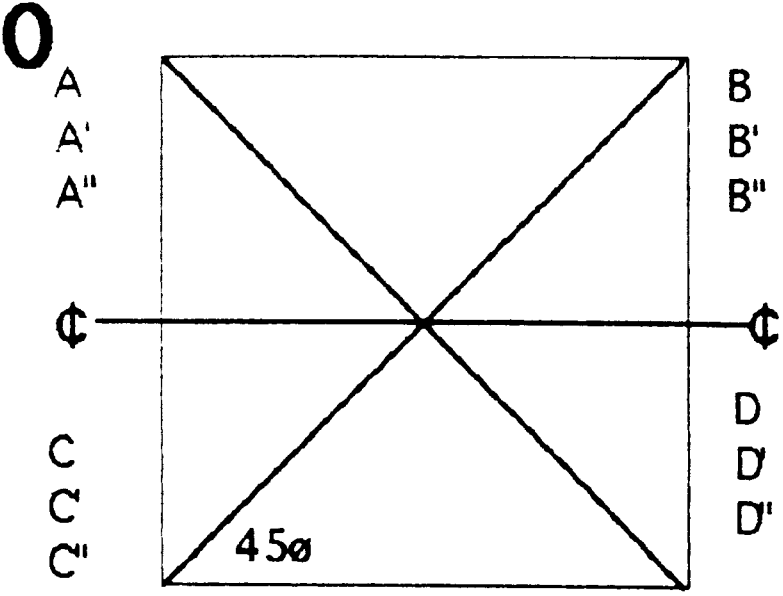

FIG. 10 Shows three super-imposed squares, ABCD, A'B'C'D' and A"B"C"D". A horizontal line is drawn through all three, and diagonals are drawn.

Figure 11:
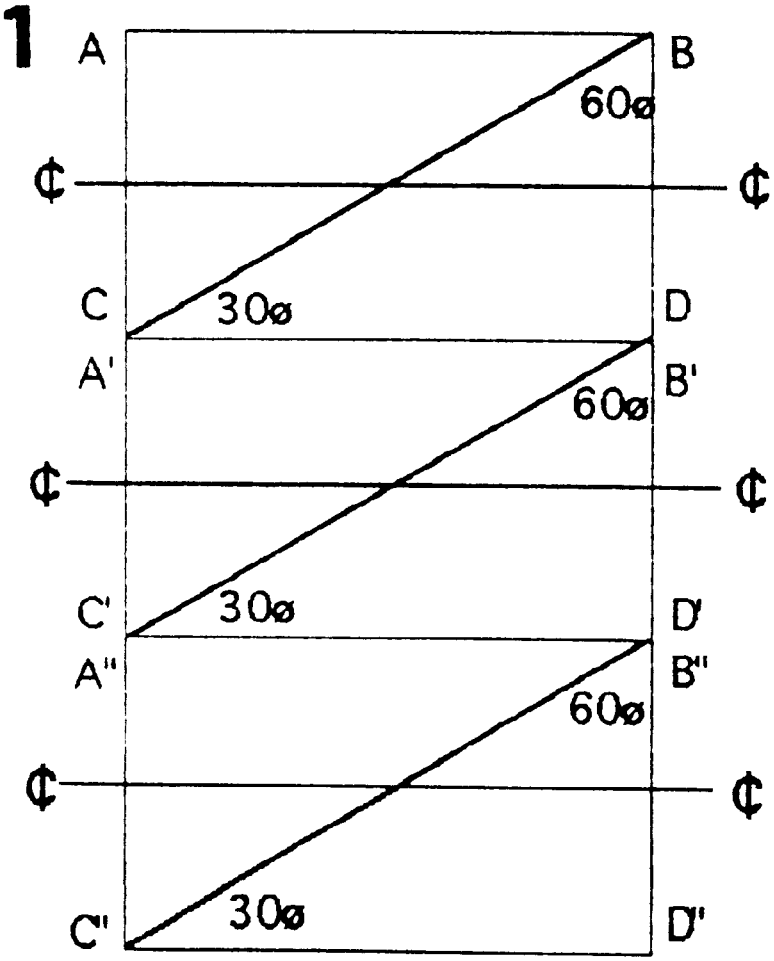

FIG. 11 Shows the same figures all tipped 45 degrees to the line of sight, at which point they are visually aligned such that their long edges appear to contact one another. The result is the ""business card" model"" in which the rough dimensions are similar to the 3.5 inch length, and 2 inch width of a standard business card. Such dimensions will approximate a diagonal of 4 inches. Since 2 inches is the opposite side in triangle B-C-D while the hypotenuse is 4 it is clear that this is the sin relationship of 0.5, or 30 degrees.

Thus the figure is approximately a 30-60-90 triangle. But since its edges are all equal as it is actually a square, edge A-C in FIG. 11 is a fore-shortened edge of a square plane seen in isometric. Thus if all three "squares" of FIG. 11 are turned 90 ortho degrees(120 iso degrees)to one another, they will form a hexagon whose apices are connected.

Sheet 6 of 22

Figure 12:
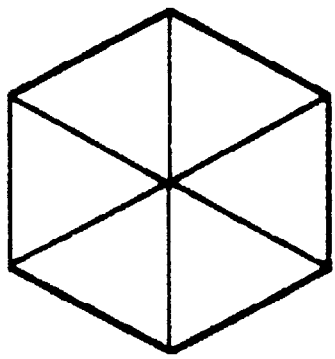

FIG. 12 Shows a hexagon made up of the 3 vertex multi-connected "business cards", forming a hexagon, while also forming a mutually, visual Star of David.

Figure 13:
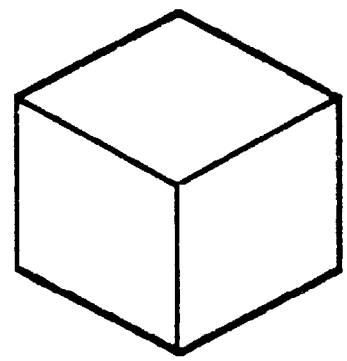

FIG. 13 Shows the same figure with all but 3 alternate radii and other lines suppressed yielding the standard visual hexagonal cube.

Figure 13A:
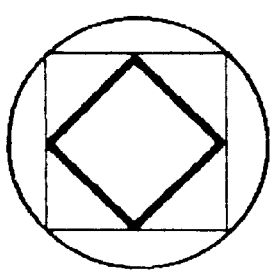

FIG. 13a shows a dark square turned 45 degrees within a larger square drawn to the circumference of a circumscribing circle. This darkened inner square represents the ortho-viewed cube within a sphere.

Figure 13B:
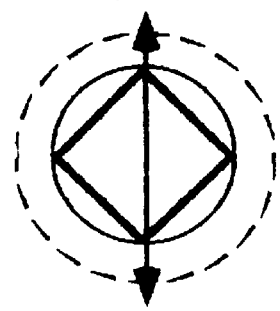

FIG. 13b. Shows a dotted circle with the heavily drawn smaller square of FIG. 13a, drawn within the first square circumscribed by a second inner circle. This inner circle represents the circular sector which would contact both a top and a bottom four cube vertices. A double arrow shows opposing vertical vectors.

Figure 13C:
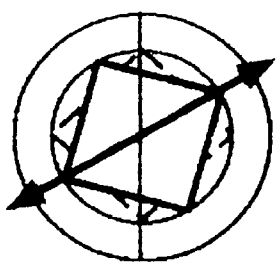

FIG. 13c. Shows the figure of FIG. 13b turned clockwise 60 degrees. This is the same as turning the square 120 degrees. The vertical double arrow shows opposing vectors at 30 degrees below, left and 30 degrees above, right to the horizontal.

Figure 13D:
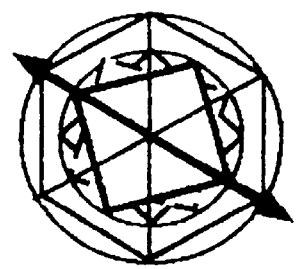

FIG. 13d. Shows the figure of FIG. 13c turned clockwise an additional 60 degrees. The vertical double arrow now shows opposing vectors at 30 degrees above, left and 30 degrees below, right to the horizontal.

Sheet 6 of 22

Figure 14:
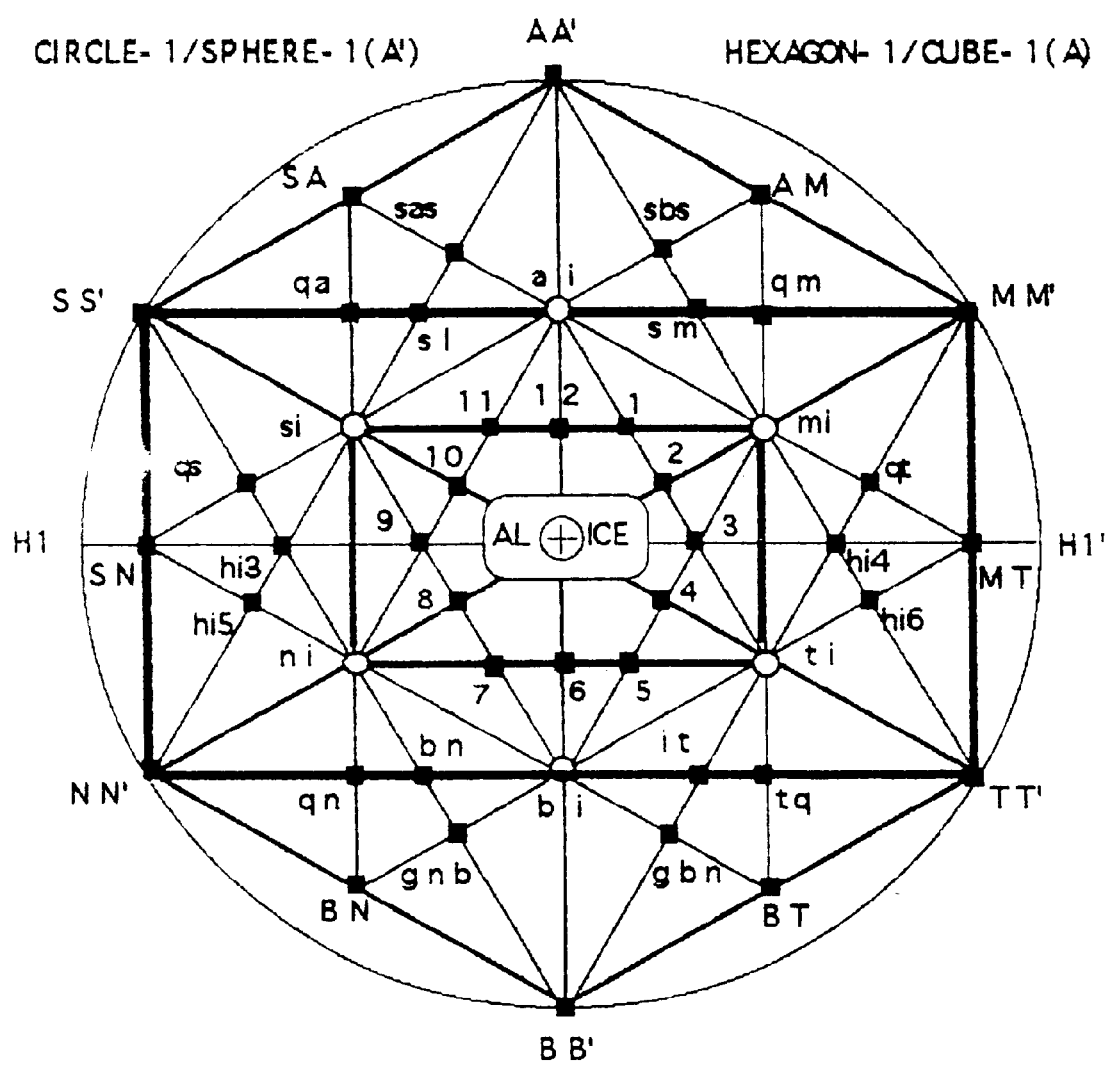

FIG. 14 Shows the V/GHOST system "Rosetta Stone". It is the geometric translator of the "one to many, but mutually exclusive". There are many geometrical figures present in this drawing. There are located within the circular bounds of FIG. 14, multiple systems. First, since FIG. 5 is the canonical matrix form for everything that follows, there are designations seen as CIRCLE-1/SPHERE-1(A') indicating that either can be selected, though mutually exclusive. Likewise, there is the designation HEXAGON-1/CUBE-1(A) for the hexagonal figure A-M-T-B-N-S. If the hexagonal figure is declared to be a cube, then CUBE-1 would be considered in isometric view as having a top, with vertices S-A-M-I providing a lozenge seen as a square with long and fore-shortened diagonals, S-M and A-I respectively.

It is clear that this is a symbolic view, since any attempt to put a cube into a sphere would show the cube some small distance away from the circumference of the visual sphere, which would be seen as a simple circle, with a hexagon interior to it.

The virtual cube resides completely within the SPHERE-1(A') with the nearest vertex located at I. As the nearest point, I is considered to be located canonical on the VDT surface, a location of ALICE (Axonometric Location of Identity, Center, and Exit). In the illustration, ICE indicates a line, seen as a point, passing from the near apex I through the center of the Cube C and ending at the apex E as the far back corner of the cube.

This assumed line is a Vallian Transhedral (TRANS), that is, the line from I to E which is the diagonal of the cube. This TRANS is also the diameter of SPHERE-1(A'). When I is part of ALICE, it is the forward-most apex of the cube SAMNBTIE. When E is at ALICE, it represents the far back corner apex, but when C (¢) appears at the ALICE position, it is the center of CIRCLE-1, the center of SPHERE-1(A), the center of HEXAGON-1, and the center of CUBE-1(A).

Next, I is given the canonical and default value of 0 0 0 in X, Y and Z values of 0 0 0 to 80 80 80, producing the Vallian integer notation of 0 0 0.

A line from I to M (Main) is considered to be the X direction. The value of X at M is 80.

A line from I to S (Secondary) is considered to be the Y direction. The value of Y at S is 80.

A line from I to B (Bottom) is considered to be the Z direction. The value of Z at B is 80.

In dealing with a cube, I - (to) M=0 - (to) 80, and has parallels B - T, N - E, and S - A. In dealing with a cube B - S=0–80 and has parallels, B - N, T - E and M - A. And finally in dealing with a cube, I - B=0–80 and has parallels S - N, A - E, and M - T.

Thus, the V/GHOST has been divided by the consideration of 3 mutually perpendicular cuts to 80 cubed, for a total of 512,000 default cube clones. All of these described points, lines, and planes in can be moved about ALICE in twelve 30 degree clockwise or counter-clockwise motions. In the first 30 degree clockwise rotations, instead of an inscribed hexagon which is point A-up, as a vertex, there will be a horizontal top line A to M. This type of movement in 30 degree increments is called a Spin Rotation, or simply Spin. There will be six of these 30 degree Spins.

If on the other hand the position of FIG. 14 is moved in 60 degree increments, there will not be a change of the point up mode of the structure, but all of the exterior indices will translated by 60 degrees for a total of six movements. Thus there will be a total of twelve 30 degree spin rotations about the center at ALICE. It can be seen that since all the apices are fixed, all of the X - Y - Z points will move relatively, and all these points will still be capable of mensuration.

It is the ubiquitous nature of the canonical views of an isometric cube that the identifying letters change positions while a general format stands still. Thus, the hidden, bottom of the cube in the standard default view, starts at E of the ALICE definition. E then, is considered the far-back-corner vertex of the cube so that, starting at E-A-S-N, the hidden left-back-face of the cube is outlined and, starting at E-A-M-T, the hidden right-back-face of the cube is outlined. Eight points can be connected to form the vertices of a cube. Without cube assumption, this figure will be seen planographically as a hexagon. As a three-dimensional figure, with all internal interstices connected, a visual hexagon (actually a cube) can be seen in its center. Within this figure, seen either isometrically or orthogonally, are numerous examples of 30/60/90, 30/30/120, and 60/60/60 triangles/or tetrahedra.

S-M, M-T, T-N, N-S outline the oblong which is the basic Vallian square, It is seen turned 45 degrees to a point of view actually perpendicular to the screen. This view is repeated as a smaller inscribed oblong si-mi, mi-ti, ti-ni, ni-si. It should also be clear that two other similar oblongs to the larger oblong S-M, M-T, T-N, N-S, exist at S-A, A-T, T-B, B-S and at A-M, M-B, B-S, S-A.

The point of this fact might be that this oblong echoes the general shape of a standard business card, such a card fitting over an area closely approximated by qa-M, M-C, C-ni, and ni-qa. The measurements thus are 3.5 inches for length, 2 inches for height, with a diagonal of 4. These figures meet the requirements of two, opposed 30-60-90 triangles.

Figure 15:
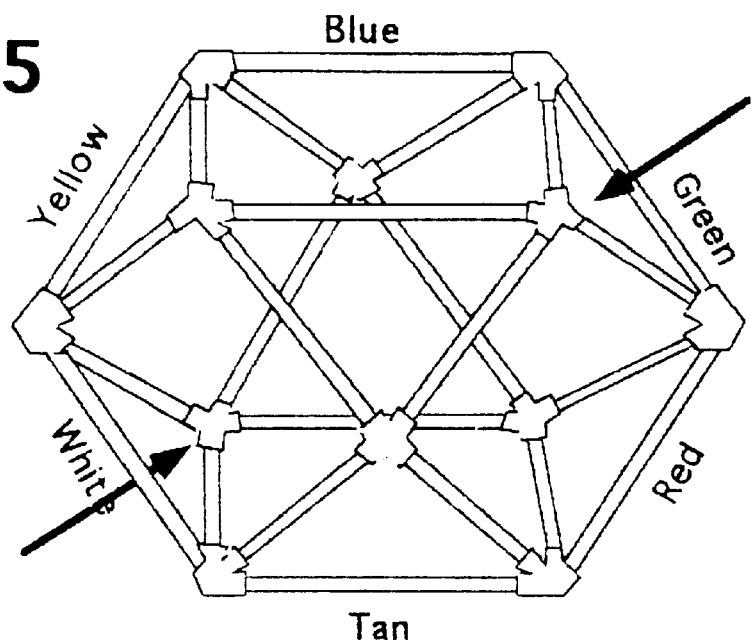

FIG. 15 This is the cubo-octahedron (highly diagrammatic) showing 24 sticks of 6 colors representing the six faces of the cube. Four blue sticks represent the top surface of the cube; opposite the blue are the four sticks of tan representing the bottom surface. Four white sticks represent a square opposite four green sticks; and four red sticks represent a surface opposite four yellow sticks. The colors blue, white, and red will ultimately represent, in cubic hexagonal form, the top blue side, the left white side, and the right red side with their related hidden opposites tan, green, and yellow, respectively. The apparent squares are all connected at their apices rather than their edges, which automatically produces eight equilateral triangles. There are blue, yellow, green triangle; blue, yellow, white triangles; a yellow, white, tan triangle; a white, tan, red triangle; red, tan, green triangle; a red, green, blue triangle, and two central equilateral triangles, forward-blue, white, red and back-tan, yellow, green.

Two small arrows are shown indicating two of four positions from which it is possible to compress the cubo-octahedron into one of two bi-stable "octa-cubohedrons".

Figure 16:
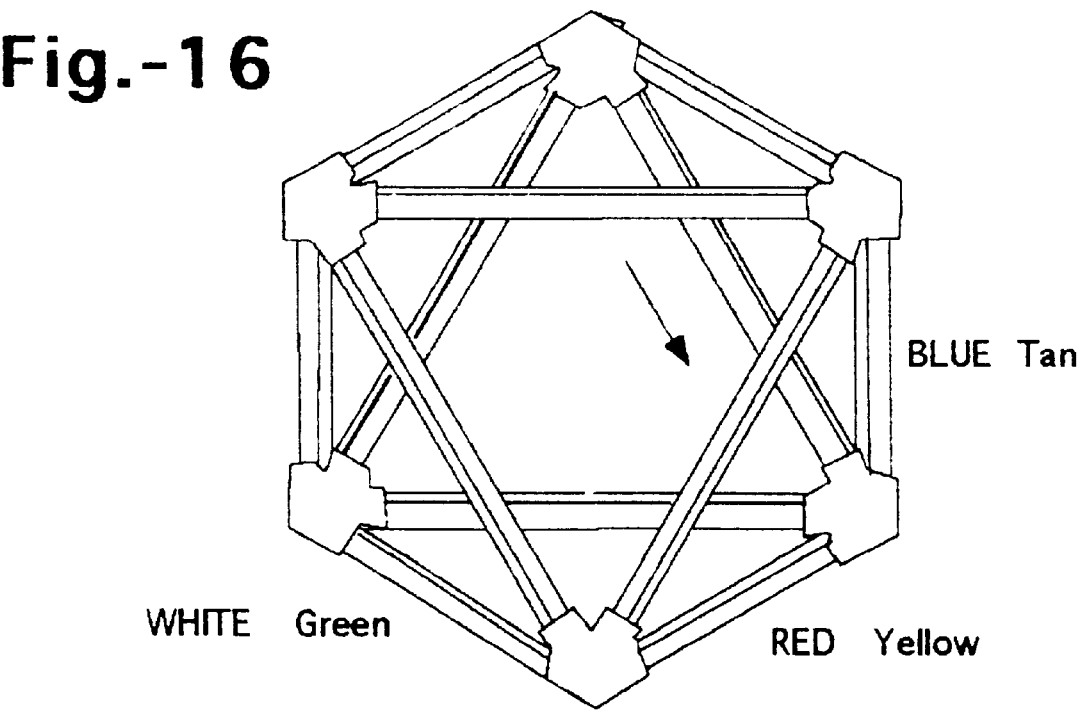

FIG. 16 Shows the compressed "octa-cubohedron" now visualized as double-sticked, variously colored, eight, equilateral triangles. Depending on the view taken 3 sets of two squares may be seen in the center of these arrays. Here in FIG. 16 a default view is shown, in which the V/GHOST cube would appear as White on the left(with Green behind) Red on the right(with Yellow behind), and Blue on the top(with Tan behind). These translations from an actual octagon, to a virtual cube, seem strained, because there is no normal geometry to account for their declarative nature. The reason they work together is because they have been programmed to do so, with a little help from Archimedes et al.

Sheet 8 of 22

Figure 17:
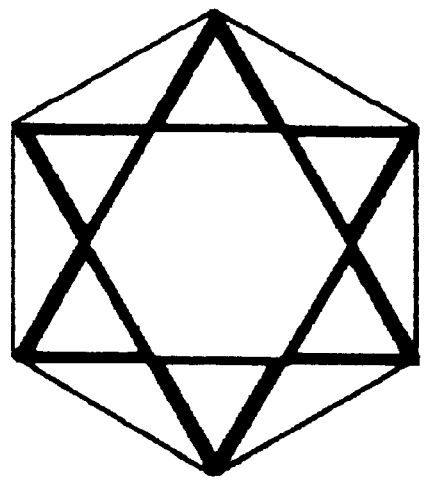

FIG. 17. shows the combining of the three 60 degree rotated "oblong, squares", into a Star of David, fitting perfectly into the hexagon.

Figure 18:
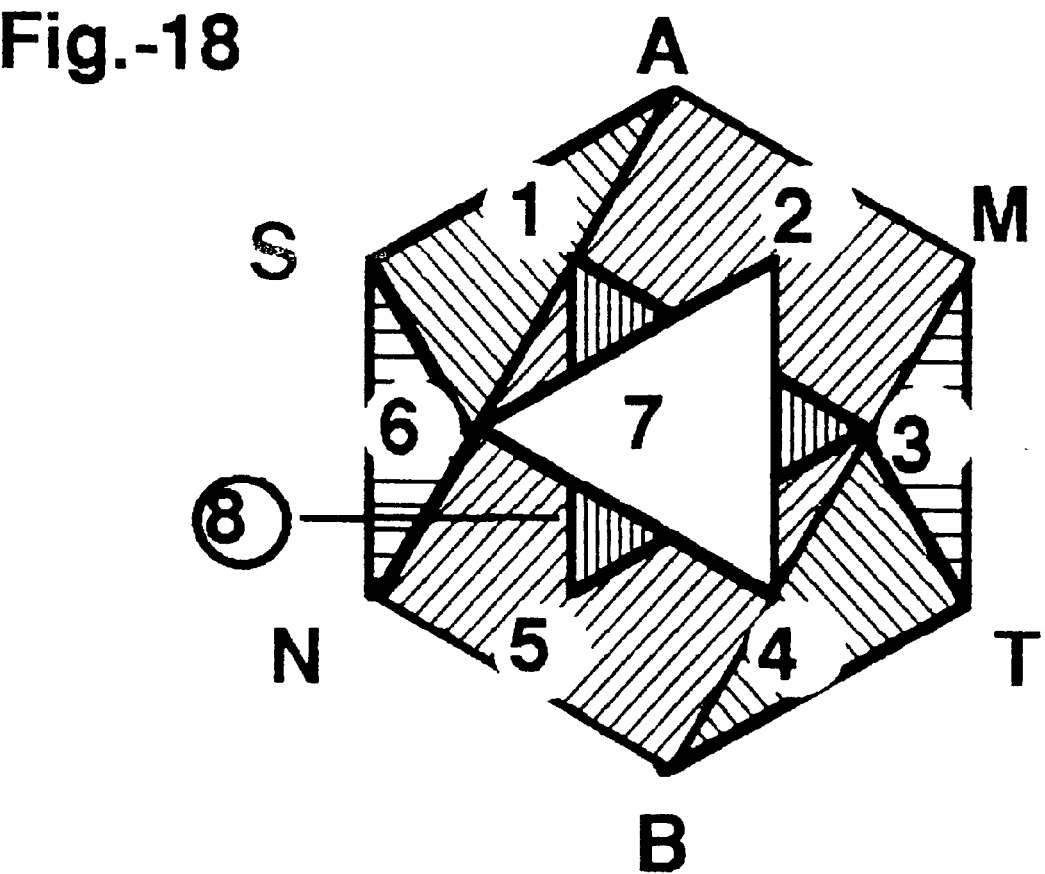

FIG. 18. shows the 6 turned squares, numbered to emphasize their general shapes and positions along with the eight included triangles.

Thus, FIG. 18 Can be seen as the Cubo-octahedron. The numbers 1–6 label the connecting outer triangles intersecting the apparent bases of isosceles triangles. The two inner triangles appear to be equilateral,(as are all the other triangles in this figure). The two equilateral triangles in the center are numbered 7 and 8, with seven being the nearest, and 8 being the furthest back. The outer six numbers will also index the short edges of six connected squares(seen as oblongs). Because the "squares" are all shown at a 45 degree angle from the isometric perpendicular to the screen, the cubo-octahedron can be considered to be the expanded model of the octahedron in FIG. 17.

Sheet 09 of 22

Figure 19:
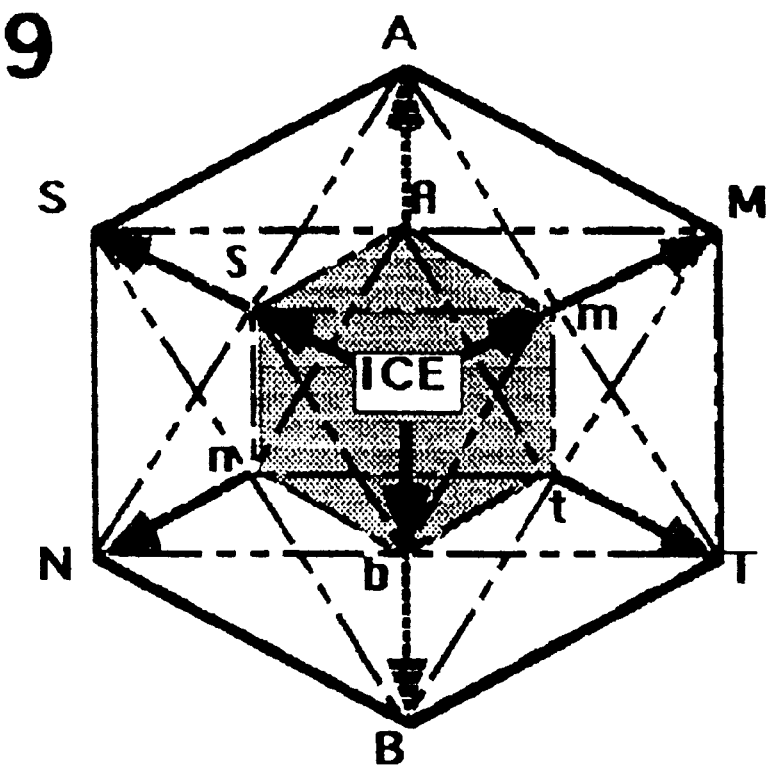

FIG. 19 Shows the Axonometric vectors produced by center lines parallel to the long edges of the "squares". These edges represent six lines obliquely moving out of the plane of the paper, and six lines moving into the plane of the paper, with the two sets of line seen as six lines foreword obscuring exactly the six lines behind. The lines radiate from a central point "C" which is common to them all, as well as a line, exiting and entering the surface seen as a point, S-B, M-N, S-T thus and A-B can also be considered to be parallel to the surface of the display thus adding generally to the other possible 14 different possible vectors, for a grand total of 20 variable vectors.

Figure 20:
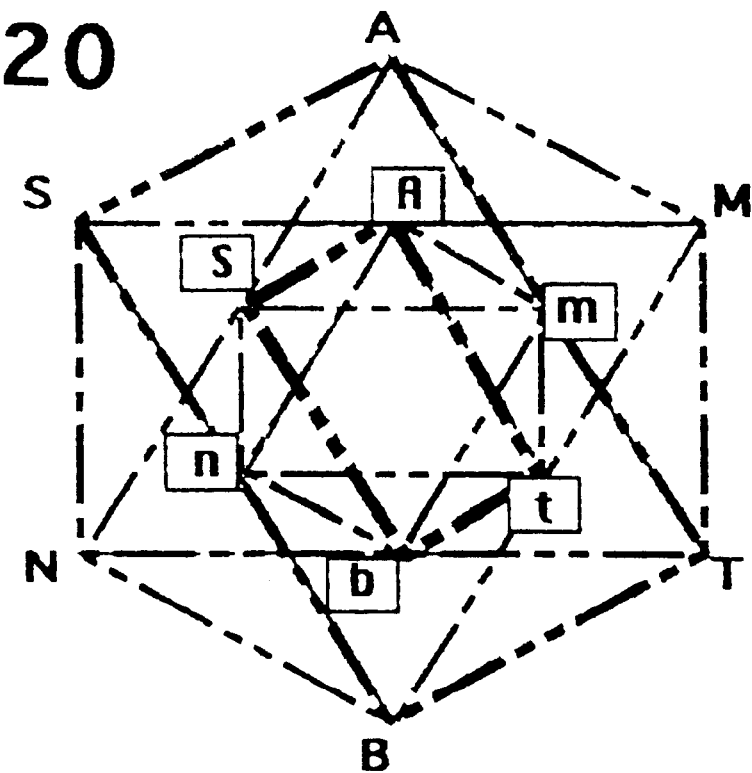

FIG. 20 Shows the six possible apical views of an octahedron. Every other equilateral triangular face is given a specific pattern for identification. Remembering that a hexagon has six apices, and eight sides(where a cube has six sides and eight apices) it is clear that these views provide the obvious outline of isometric squares. These can be thought of as the simultaneous interior bases of the octahedron. It is clear that in any view, these square bases will always be mutually perpendicular, crossing at a definitive and unique point, in the middle of a given view of an octahedron.

Thus FIG. 20 shows the SAMNBTIE exterior cube, with the interior samnbtie octagon(Tesseract)all as VIRTUIAL objects. Emphasized at squared s-a,a-t,t-b.b-s in the smaller hexagon, as well as S-A,A-T,T-B. T-B. and B-S in the larger hexagon are two squares posing as "business card shapes".

In the same figure, as a virtual octahedron, triangles A-S-N and its opposite A-M-T, as well as back plane, S-A-M although all being visual 30-30-120 triangles, are actually, by construction, identical to N-A-T which is an equilateral triangle. These angles form the four-sided pyramid necessary, while a lower mirrored image of triangles S-M-B, S-B-N, its opposite M-B-T, and the lower N-B-T, finish the construction.

Sheet 10 of 22

FIG. 21. shows the THE (Transitional Hexagonal Entity "cube" outlined as 8 variously hexagonally visualized, catalogued "objects", as composite, multiple, figures included in the ELF and V/GHOST.

The THE stands for Transitional Hexagonal Entity. The THE shows that a minimum of eight different figures can be contained in the THE generalized hexagon. In the drawing are arrows drawn between the THE, and other figures. These three figures are the ELF, the V/GHOST, and at FIG. 22 the "Cubo-octahedron", and its compressed "Octa-cubohedron".

The ELF described as a wire-model of 3 equal lengths turned mutually perpendicular to one another. The entire V/GHOST can be considered to be made up of these primitive 3-D objects, although it is impossible to tell where they start or where they end, simply that they do. There are two general types of ELFs; type one are right-handed, and type two are left-handed. This determination is made because after the first bend in the wire has been made(as a 90 degree angle) the next 90 degree angle bend can be made by one of two bends, 180 degrees apart. The tetra-, hexa-, octa-, dodecca-, and icosa-hedrons will all fit in the footprint of the THE hexagon.

Sheet 11 of 22

Figure 23:
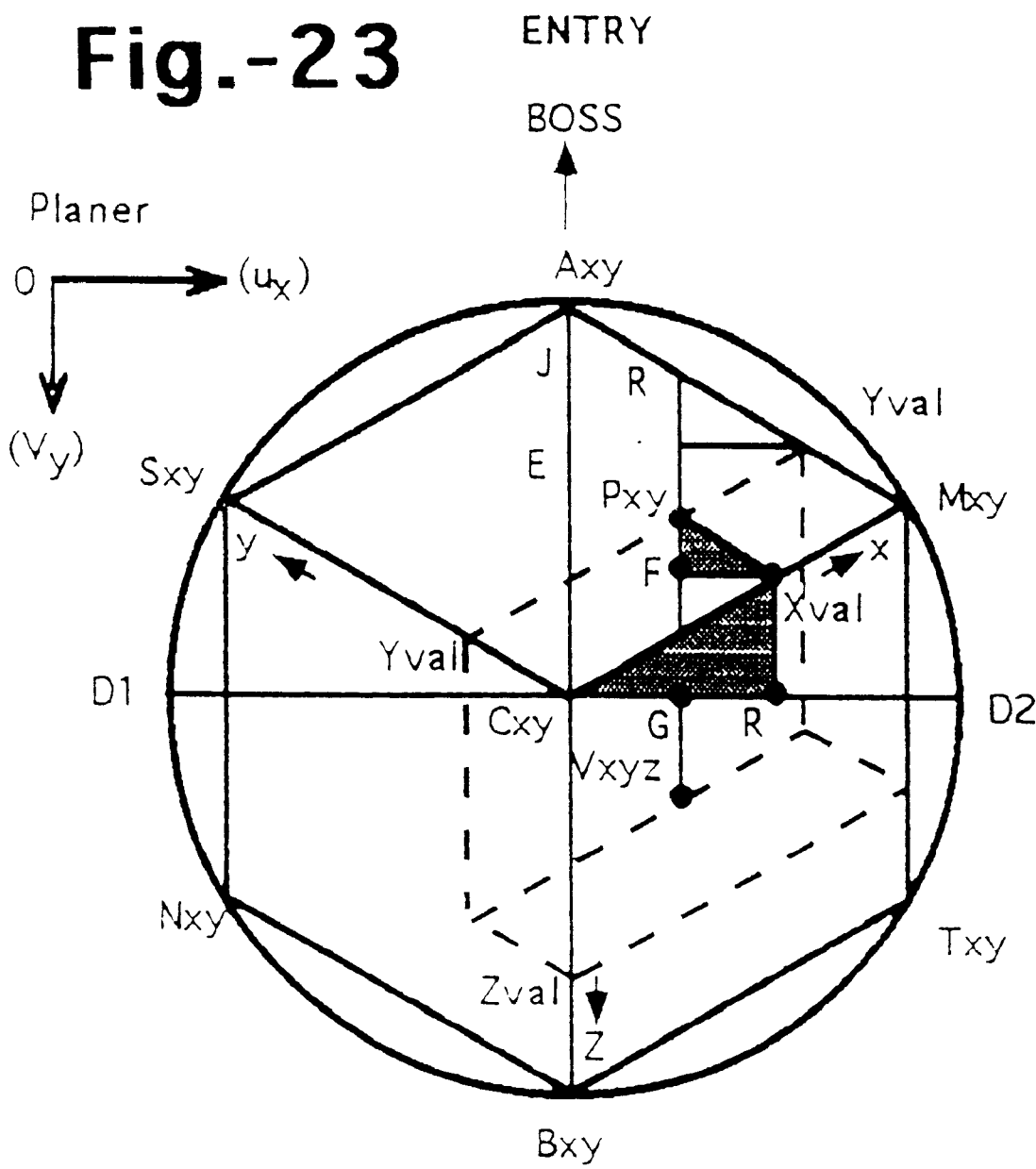

FIG. 23. Shows a programmers view of the geometry and Math Analysis of Entry of material into the V/GHOST system.

Note that in line 14., the formula starts to use the $\sqrt{3}$ (therefore the ELF) as the essential loop for converting from V/GHOST cubic to raster mechanics; i.e., Because $\Delta$ IGF is 30-60-90, it follows that FG/CG=Tan 30o=$\sqrt{3}/3$, thus FG=$\sqrt{3}/3$ IG. On Sheet 11 of 22 and on Sheet 12 of 22 the word, "BOSS" indicates one of the four directions which the Control Surface can take. There are: upper, lower; right, left control surfaces for each and every face color.

Note in the present system no accommodation has yet been made for colors for either control surfaces or secondary and tertiary faces. These color effects call for additional programming which is a financial constraint at this time.

1. Construct parallelogram SAMI comprised of adjacent equilateral triangles $\Delta$S A I and $\Delta$A M 2. Construct a circle centered at I passing through A.

3. Construct through I a horizontal diameter D1-I-D2.

4. Choose any arbitrary point P inside $\Delta$ A M I.

5. Construct a line(dotted)through P parallel to side I M meeting sides M A and I S respectively in the points Y' and Y.

6. Construct a line(dotted)through P parallel to side M A meeting sides I M and S A respectively in the points X and X'.

7. Construct a vertical line through P intersecting side M A in the point H, side I M in the point F and diameter D1–D2 in the point G.

8. At this juncture impose computer screen coordinates on the figure thus constructed. Call these coordinates u and v. "u" will be measured along the horizontal increasing as the observer scans from the left to the right of the screen. "v" will be measured along the vertical from the top to the bottom of the screen.

9. Note that $\Delta$ H Y'P is equilateral since its sides are parallel to the sides of $\Delta$ A M I. The same is true of $\Delta$ P F X.

10. It is required to find computer coordinates for the points X and Y.

11. Begin with point Y. Because P X I Y and P Y'M X are both parallelograms and $\Delta$ P X F is equilateral, it follows that IY=PX=PF.

12. Now PF=PG−FG

13. PG=Gv−Pv=Iv−Pv.

14. Because $\Delta$ IGF is 30-60-90, it follows that FG/CG= Tan 30o=$\sqrt{3}/3$, thus FG=$\sqrt{3}/3$ IG.

15. CG=Gu−Iu=Pu−Iu.

16. IY=PF=PG−FG=(Iv−Pv)+$\sqrt{3}/3$(Iu−Pu).

17. Now IYu=the horizontal projection of IY or IYu=$\sqrt{3}/2$ IY=[(Iv−Pv)+$\sqrt{3}/3$ (Iu−Pu)].

18. But, IYu=Iu−Yu so Yu=Iu−$\sqrt{3}/2$[(Iv−Pv) $\sqrt{3}/2$(Iv−Pv)−½(Iu−Pu)=½(Iu+Pu)−$\sqrt{3}/2$(Iv−Pv). $\sqrt{3}/3$(Iu−Pu)]=½(Iv−Pv)+$\sqrt{3}/6$(Iu−Pu).

19. IYv=V vertical projection of IY. Hence IYv=½ IY=½ [(Iv−Pv)+20. But IYv=Iv−Yv so Yv=Iv−½(Iv−Pv)−$\sqrt{3}/6$(Iu−Pu)=½(Iv+Pv)−$\sqrt{3}/6$(Iu−Pu).

21. Next compute the computer coordinates of Point X.

22. IX=IF+FX.

23. Since $\Delta$P F X is equilateral, it follows that FX=PX=IY (Iv−Pv)+$\sqrt{3}/3$(Iu−Pu).

24. Since $\Delta$FIG is 30-60-90 it follows that IG/IF=$\sqrt{3}/2$ thus IF=2/$\sqrt{3}$IG=2=$\sqrt{3}/3$ IG=2$\sqrt{3}/3$(Gu−Iu)=2$\sqrt{3}/3$(Pu−Iu)=−2$\sqrt{3}/3$(Iu−Pu).

25. IX=IF+FX=(Iv−Pv)−$\sqrt{3}/3$(Iu−Pu).

26. IXu=Xu−Iu=$\sqrt{3}/2$ IX=$\sqrt{3}/2$(Iv−Pv)−½(Iu−Pu).

27. Xu=½(Iu+Pu)+$\sqrt{3}/3$(Iu−Pu)+$\sqrt{3}/2$(Iv−Pv).

28. IXv=Iv−Xv=½IX=½(Iv−Pv)−$\sqrt{3}/6$(Iu−Pu).

29. Xv=½(Iv+Pv)+$\sqrt{3}/6$(Iu−Pu).

30. To summarize:(Computer coordinates of Point X are:
Xu=½(Iu+Pu)+$\sqrt{3}/2$(Iv−Pv).$\sqrt{3}/2$(Iv−Pv)
Xv=½(Iv+Pv)+$\sqrt{3}/6$(Iu−Pu)).
(Computer coordinates of Point Y are:
Yu=½(Iu+Pu)−$\sqrt{3}/2$(Iv−Pv)$\sqrt{3}/2$(Iv−Pv)
Yv=½(Iv+Pv)−$\sqrt{3}/6$(Iu−Pu)).

Note: IX Xval

IY=Yval

Figure 24:
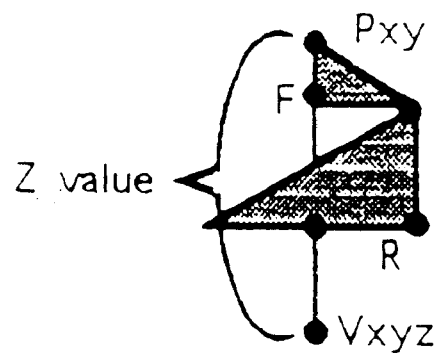

FIG. 24 Is a detail view of the extracted points Pxy, F, R, and Vxyz, more clearly showing the depth derived between Pxy and the triple value at Vxyz.

Sheet 12 of 23

Figure 25:
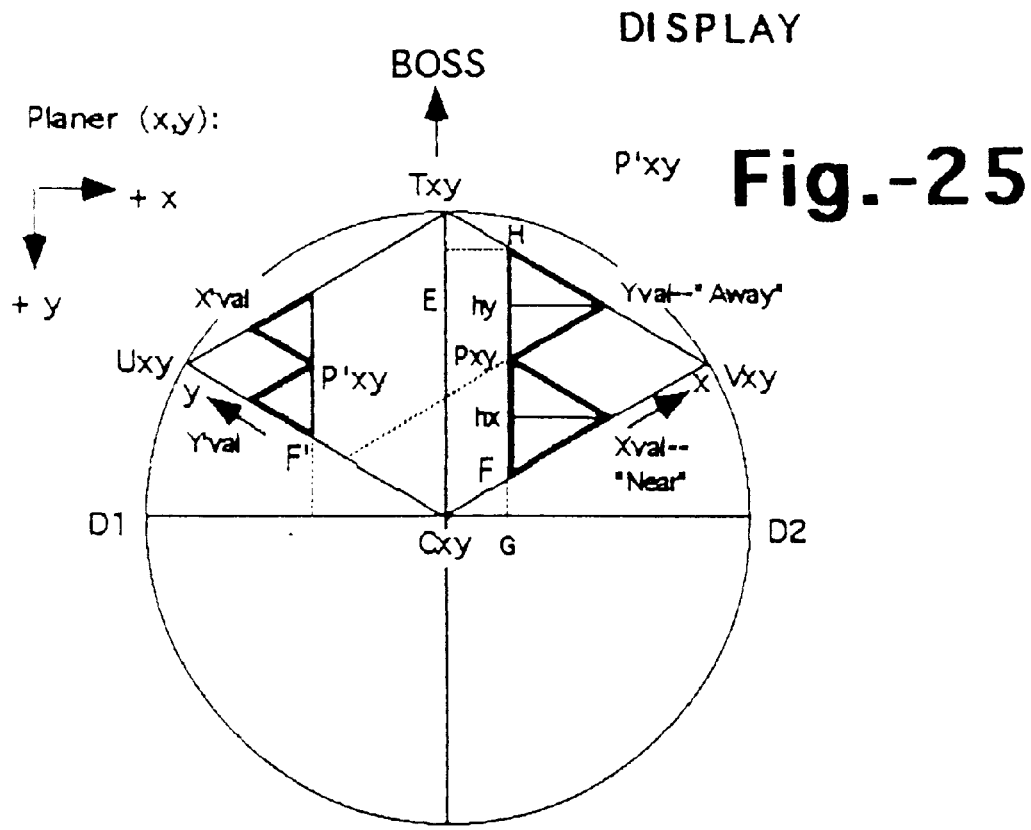

FIG. 25 Consider the equilateral triangle Cxy - Vxy - Txy (C - V - T) with sides of length E. Let the side Cxy - Txy be perpendicular to the line D1 - Cxy-D2. Construct an equilateral triangle Cxy - Uxy - Txy. The pair of triangles form a parallelogram.

Consider an arbitrary, but fixed, point Pxy (P), inside triangle C - V -T.

Construct a line through P, parallel to C - T, from some point H on line V - T, intersecting C - V at some point F, and extending to line D1 - C -D2 at some point G.

Consider a dotted line through Pxy, parallel to C - V, from line C -U to some point Yval on line T-V. Consider a dotted line from P, parallel to T-V, to some point Xval on line C - V .The locations of Xval and Yval are of interest and can be determined constructively and algebraically.

Triangles P - E - Yval and P - F - Xval are equilateral triangles. Construct the midpoint hX of the line P - F. Perpendicular to P - F, construct a line from hX to Xval. (P - F - Xval is equilateral.)

Construct the midpoint hY of the line P - H. Perpendicular to P - E, construct a line from hY to Yval. (P - F - Yval is equilateral.)

Note that:

$$|F - Pxy| = |Pxy - Xval| = |F - Xval| \quad \text{(equilateral triangle)},$$

$$\text{and} = |Vxy - Yval| \quad \text{(an equal angle transverse)}.$$

$$= |Vxy - Yval| \quad \text{(an equal angle transverse)}.$$

Algebraically, let each point by described by (x, y), such that x increases from top to bottom and y increased from left to right. (This component of F is also Px. corresponds to a display terminal raster.) Let the line Cxy - Txy be vertical (x is constant) and the line D1 Cxy D2 be horizontal {y is constant}. Let Cx and Cy be the respective x and y components of Cxy. Similarly for Pxy. Note that point G=(Px, Cy), and the x Triangles Txy-H-J and Cxy-F-G are 30/60/90 degree triangles (two parallel lines, a line perpendicular to one is perpendicular to the other). Since |H - J|=|Cxy - G|, T-H-J and C-F-G are the same size, and |Txy - J|=|F - G|.

Thus, the distance E=I |Txy - Cxy|=|Txy - J|+|H - F|+|F - G|.

Therefore, $$|H - F| = |Txy - Cxy| - |Txy - J| - |F - G|$$

$$= |Txy - Cxy| - 2(|F - G|).$$

Find Yval.

Since $|F - G| = (1/\sqrt{3})(Px - Cx)$, $$|H - F| = E - (2/\sqrt{3})(Px - Cx) = E - 2/\sqrt{3}\,Cx - 2/\sqrt{3}\,Px.$$

$$|Vxy - Yval| = |Pxy - G| - |F - G|.$$

-continued

Thus, $$Yval = (Cy - Py) - 1/\sqrt{3}\,(px - Cx), \text{ or}$$

$$Yval = Cy + 1/\sqrt{3}\,Cx - Py - 1/\sqrt{3}\,Px.$$

Now find Xval.

Note that $|H - Pxy| = |Xval - Vxy|$ $$|Cxy - Xval| + |Xval - Vxy| = E = |Cxy - Xval| + |H - Pxy|.$$

So, $$E = |Cxy - Xval| + |H - Pxy| = |Txy - J| + |H - Pxy| + |Pxy - G|.$$

Thus, $$|Cxy - Xval| = |Txy - J| + |Pxy - G|, \text{ and}$$

$$= |F - G| + |Pxy - G|.$$

Algebraically, $$Xval = (1/\sqrt{3})(Px - Cx) + (Cy - Py).$$

$$Xval = Cy - 1/\sqrt{3}\,Cx - Py + 1/\sqrt{3}\,Px$$

Figure 26:
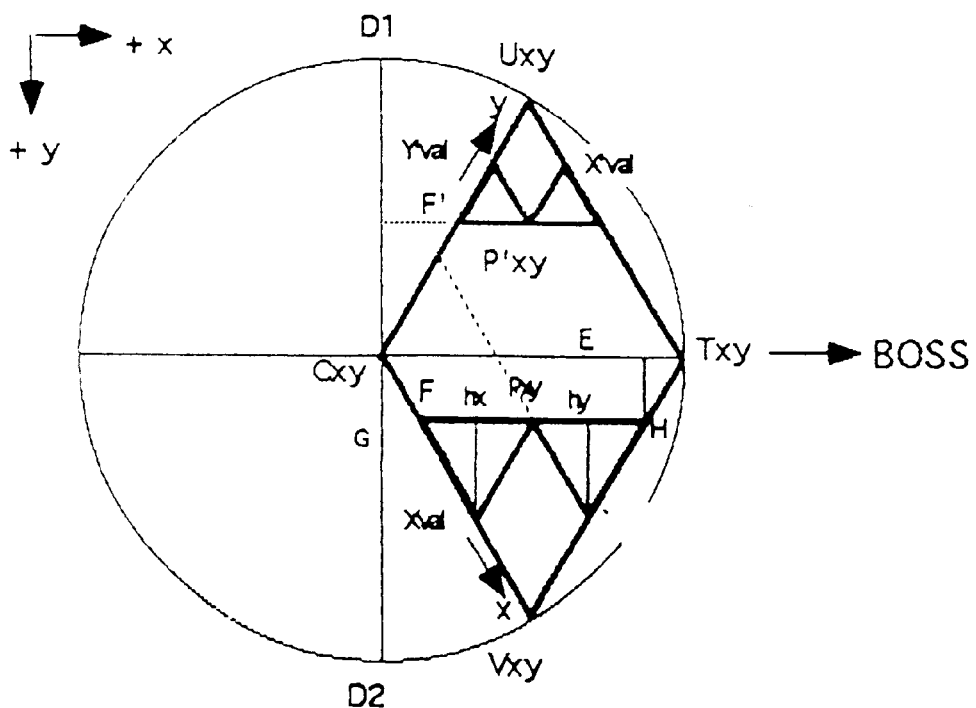
Figure 27:

FIG. 26 is a programmers Display view of the detail of the X Y Z locations and Math Analysis of Display rotated right 90 degrees from FIG. 25 in the V/GHOST system.

Consider the equilateral triangle Cxy - Vxy - Txy (C - V - T) with sides of length E. Let the side Cxy - Txy be perpendicular to the line D1 - Cxy-D2. Construct an equilateral triangle Cxy - Uxy - Txy. The pair of triangles form a parallelogram.

Consider an arbitrary, but fixed, point Pxy (P), inside triangle C - V - T.

Construct a line through P, parallel to C - T, from some point H on line V - T. intersecting C - V at some point F, and extending to line D1 - C - D2 at some point G.

Consider a dotted line through Pxy, parallel to C - V, from line C -U to some point Yval on line T-V. Consider a dotted line from P, parallel to T-V, to some point Xval on line C - V. The locations of Xval and Yval are of interest and can be determined constructively and algebraically.

Triangles P - H - Yval and P - F - Xval are equilateral triangles. Construct the midpoint hX of the line P - F. Perpendicular to P - F, construct a line from hX to Xval. (P - F - Xval is equilateral.)

Construct the midpoint hY of the line P - H. Perpendicular to P - H, construct a line from hY to Yval. (P - F - Yval is equilateral.)

Note that:

$$|F - Pxy| = |Pxy - Xval| = |F - Xval| \quad \text{(equilateral triangle)},$$

$$\text{and} = |Vxy - Yval| \quad \text{(an equal angle transverse)}.$$

$$= |Vxy - Yval| \quad \text{(an equal angle transverse)}.$$

Algebraically, let each point by described by (x, y), such that x increases from top to bottom and y increased from left to right. (This component of F is also Px. corresponds to a display terminal raster.) Let the line Cxy - Txy be vertical (x is constant) and the line D1 Cxy D2 be horizontal (y is constant). Let Cx and Cy be the respective x and y components of Cxy. Similarly for Pxy. Note that point G=(Px, Cy), and the x Triangles Txy-H-J and Cxy-F-G are 30/60/90 degree triangles (two parallel lines, a line perpendicular to one is perpendicular to the other). Since $|H - J|=|Cxy - G|$, T-H-J and C-F-G are the same size, and $|Txy - J|=|F - G|$.

Thus, the distance $$E = |Txy - Cxy| = |Txy - J| + |H - F| + |F - G|.$$

Therefore, $$|H - F| = |Txy - Cxy| - |Txy - J| - |F - G|$$

$$= |Txy - Cxy| - 2(|F - G|).$$

Find Yval.

Since $|F - G| = (1/\sqrt{3})(Px - Cx)$, $$|H - F| = E - (2/\sqrt{3})(Px - Cx) = E - 2/\sqrt{3}\,Cx - 2/\sqrt{3}\,Px.$$

$$|Vxy - Yval| = |Pxy - G| - |F - G|.$$

Thus, $$Yval = (Cy - Py) = 1/\sqrt{3}\,(Px - Cx), \text{ or}$$

$$Yval = Cy + 1/\sqrt{3}\,Cx - Py - 1/\sqrt{3}\,Px.$$

FIG. 27

Primary positions of the V/GHOST

Figure 28:
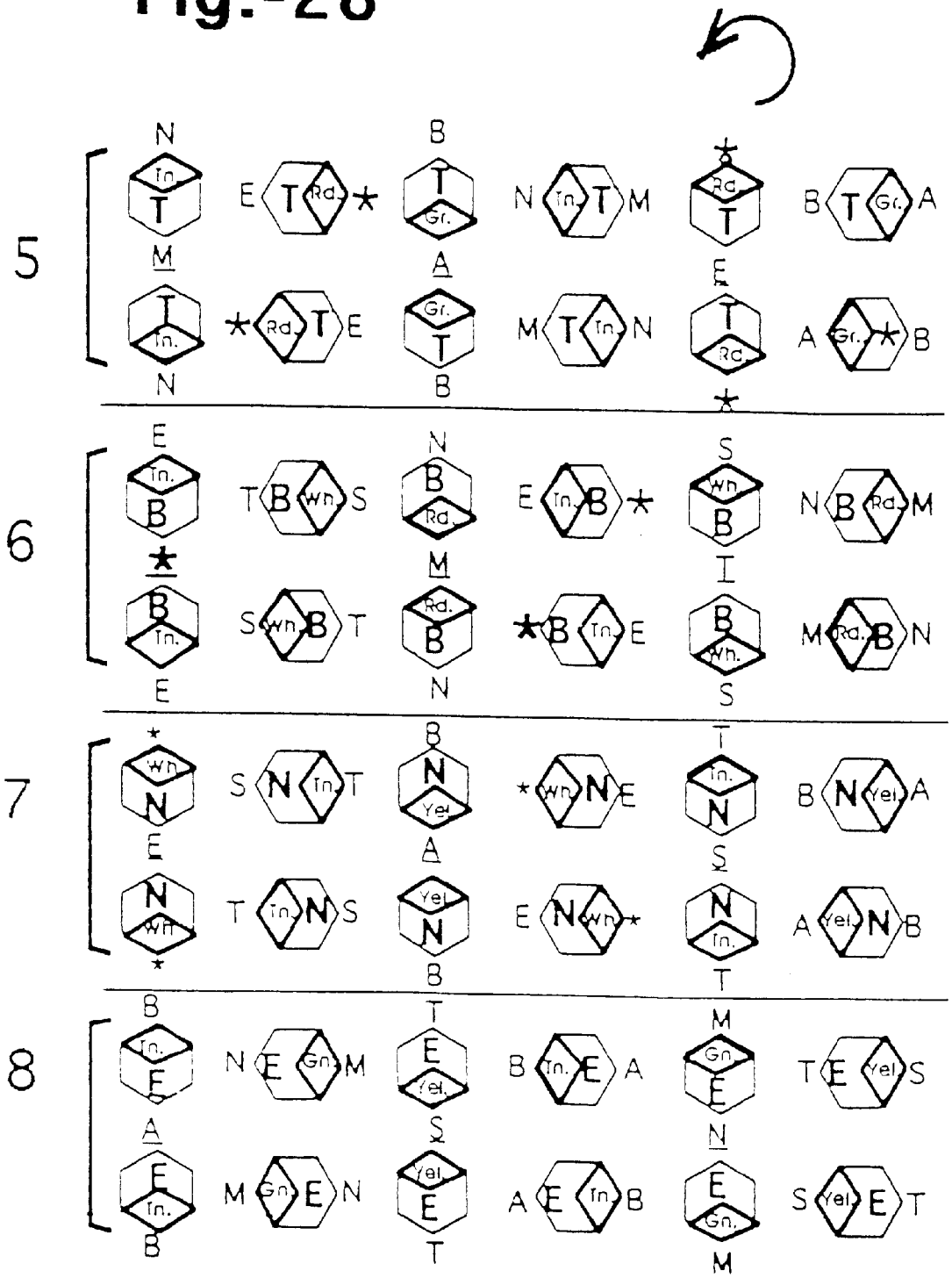

There are 96 key isometric Vallian positions.(Sheet 15 OF 24) FIG. 28. FIG. 14). Each vertex has a local identifier (S, A, M, N, B, T, I, or E). In any Isometric position, star{*}can stand in for the I vertex except when I is shown at ALICE. In any of these 96 positions only three colors can appear. In the default position the three are: Blue, White, and Red. As the cube is turned, this set changes position in 12 spin rotations. The center apex remains centered, and the other apices revolve around it. In the presentation of positions, the movement of the cube will be in CCW (counter-rotated direction), although in the application program both CW and CCW are supported.

First a list will be made of the 12 positions for the first(*) apex, and then the cube will be turned such that the blue top will continue to be present (the Tan absent) through 4 table rotation movements, bringing a new apex into view (M, A, S). Each of these will be described in 12 Spin rotations, and then the cube will be Flipped so that in the next movements all colors will show in sequences which include Tan, excluding Blue.

The VALLIAN/QUASI MODAL ELF GEOMETRY works such that, in the various rotations, the minor diagonal of a face will appear in one of four possible positions in which its minor diagonal will coincide with either a screen vertical or a screen horizontal. When one colored face, and only that face, merges into the vertical or horizontal screen position, it is called the Control Surface. This position is shown on the BEEZUL as well as being called up as the Plan View in the orthogonal display.

Formatting this procedure will involve describing the apex first, followed by parentheses ( ) enclosing the control surface color, followed by brackets [ ] describing in CCW the two adjoining face colors. Finally, after the dash - will be the minor diagonal of the control surface and diagonal's associated contiguous edge as a sequence of three letters starting at the exterior apex of the diagonal.

01 . Star *=(Blue) [White, Red] - Top, A * B

02 . Star *=(Red) [Blue, White] - Right, T * S

03 . Star *=(White) [Red, Blue] - Bottom, N * M
04 . Star *=(Blue) [White, Red] - Left, A * B
05 . Star *=(Red) [Blue, White] - Top, T * S
06 . Star *=(White) [Red, Blue] - Right, N * M
07 . Star *=(Blue) [White, Red] - Bottom, A * B
08 . Star *=(Red) [Blue, White] - Left, T * S
09 . Star *=(White) [Red, Blue] - Top, N * M
10 . Star *=(Blue) [White, Red] - Right, A * B
11 . Star *=(Red) [Blue, White] - Bottom, T * S
12 . Star *=(White) [Red, Blue] - Left, N * H
13 . M=(Blue) [Red, Green] - Top, S M T
14 . M=(Green) [Blue, Red] - Right, E M *
15 . M=(Red) [Green, blue] - Bottom, B M A
16 . M=(Blue) [Red, Green] - Left, S M T
17 . M=(Green) [Blue, Red] - Top, E M *
18 . M=(Red) [Green, Blue] - Right, B M A
19 . M=(Blue) [Red, Green] - Bottom, S M T
20 . M=(Green) [Blue, Red] - Left, E M *
21 . M=(Red) [Green, Blue] - Top, B M A
22 . M=(Blue) [Red, Green] - Right, S M T
23 . M=(Green) [Blue, Red] - Bottom, E M *
24 . M=(Red) [Green, Blue] - Left, B M A
25 . A=(Blue) [Green, Yellow) - Top, * A E
26 . A=(Yellow) [Blue, Green] - Right, N A M
27 . A=(Green) [Yellow, Blue] - Bottom, T A S
28 . A=(Blue) [Green, Yellow] - Left, * A E
29 . A=(Yellow) [Blue, Green] - Top, N A M
30 . A=(Green) [Yellow, Blue] - Right, T A S
31 . A=(Blue) [Green, Yellow] - Bottom, * A E
32 . A=(Yellow) [Blue, Green] - Left, N A M
33 . A=(Green) [Yellow, Blue] - Top, T A S
34 . A=(Blue) [Green, Yellow] - Right, * A E
35 . A=(Yellow) [Blue, Green] - Bottom, N A M
36 . A=(Green) [Yellow, Blue] - Left, T A S
37 . S=(Blue) [Yellow, white] - Top, M S N
38 . S=(White) [Blue, Yellow] - Right, B S A
39 . S=(Yellow) [White, Blue] - Bottom, E S *
40 . S=(Blue) [Yellow, White] - Left, M S N
41 . S=(White) [Blue, Yellow] - Top, B S A
42 . S=(Yellow) [White, Blue] - Right, E S *
43 . S=(Blue) [Yellow, White] - Bottom, M S N
44 . S=(White) [Blue, Yellow] - Left, B S A
45 . S=(Yellow) (White, Blue] -Top, E S *
46 . S=(Blue) [Yellow, White] - Right, M S N
47 . S=(White) [Blue, Yellow] - Bottom, B S A
48 . S=(Yellow) [White, Blue] - Left, E S *

Sheet 14 of 22

FIG. 28
Flip Cube of FIG. 15, 180 degrees to apex T
49 . T=(Tan) [Green, Red] - Top, N T M
50 . T=(Red) [Tan, Green] - Right, * T E
51 . T=(Green) [Red, Tan] - Bottom, A T B
52 . T=(Tan) [Green, Red] - Left, N T M
53 . T=(Red) [Tan, Green] - Top, * T E
54 . T=(Green) [Red, Tan] - Right, A T B
55 . T=(Tan) [Green, Red] - Bottom, N T M 56 . T=(Red) [Tan, Green] - Left, * T E
57 . T=(Green) [Red, Tan] - Top, A T B
58 . T=(Tan) [Green, Red] - Right, N T M
59 . T=(Red) [Tan, Green] - Bottom, * T E
60 . T=(Green) [Red, Tan] - Left, A T B
61 . B=(Tan) [Red, White] - Top, E B *
62 . B=(White) [Tan, Red] - Right, S B T
63 . B=(Red) [White, Tan] - Bottom, M B N
64 . B=(Tan) [Red, White] - Left, E B *
65 . B=(White) [Tan, Red] - Top, S B T
66 . B=(Red) [White, Tan] - Right, M B N
67 . B=(Tan) [Red, White] - Bottom, E B *
68 . B=(White) [Tan, Red] - Left, S B T
69 . B=(Red) [White, Tan] - Top, M B N
70 . B=(Tan) [Red, White] - Right, E B *
71 . B=(White) [Tan, Red] - Bottom, S B T
72 . B=(Red) [White, Tan] - Left, M B N
73 . N=(Tan) [White, Yellow] - Top, T N S
74 . N=(Yellow) [Tan, White] - Right, A N B
75 . N=(White) [Yellow, Tan] - Bottom, * N E
76 . N=(Tan) [White, Yellow] - Left, T N S
77 . N=(Yellow) [Tan, White] - Top, A N B
78 . N=(White) [Yellow, Tan] - Right, * N E
79 . N=(Tan [White, Yellow] - Bottom, T N S
80 . N=(Yellow) [Tan, White] - Left, A N B
81 . N=(White) [Yellow, Tan] - Top, * N E
82 . N=(Tan) [White, Yellow] - Right, T N S
83 . N=(Yellow) [Tan, White] - Bottom, A N B
84 . N=(White) [Yellow, Tan] - Left, * N E
85 . E=(Tan) [Yellow, Green] - Top, B E A
86 . E=(Green) [Tan, Yellow] - Right, M E N
87 . E=(Yellow) [Green, Tan] - Bottom, S E T
88 . E=(Tan) [Yellow, Green] - Left, B E A
89 . E=(Green) [Tan, Yellow] - Top, M E N
90 . E=(Yellow) [Green, Tan] - Right, S E T
91 . E=(Tan [Yellow, Green] - Bottom, B E A
92 . E=(Green) [Tan, Yellow] - Left, M E N
93 . E=(Yellow) [Green, Tan] - Top, S E T
94 . E=(Tan) [Yellow, Green] - Right, B E A
95 . E=(Green) [Tan, Yellow] - Bottom, M E N
96 . E=(Yellow) [Green, Tan] - Left, S E T Sheet 15 of 22

FIG. 29 Shows 6 orthogonal views of mid apex-centered octahedrons. Below these six figures is the stretch-out of the octahedron. The stretch out and the orthogonal views have triangles indexed with four different types of cross-hatching, which show in the orthogonal views what the stretch-out will look like from the six different apical views, when the stretch-out is properly assembled.

Sheet 16 of 24

Figure 30:
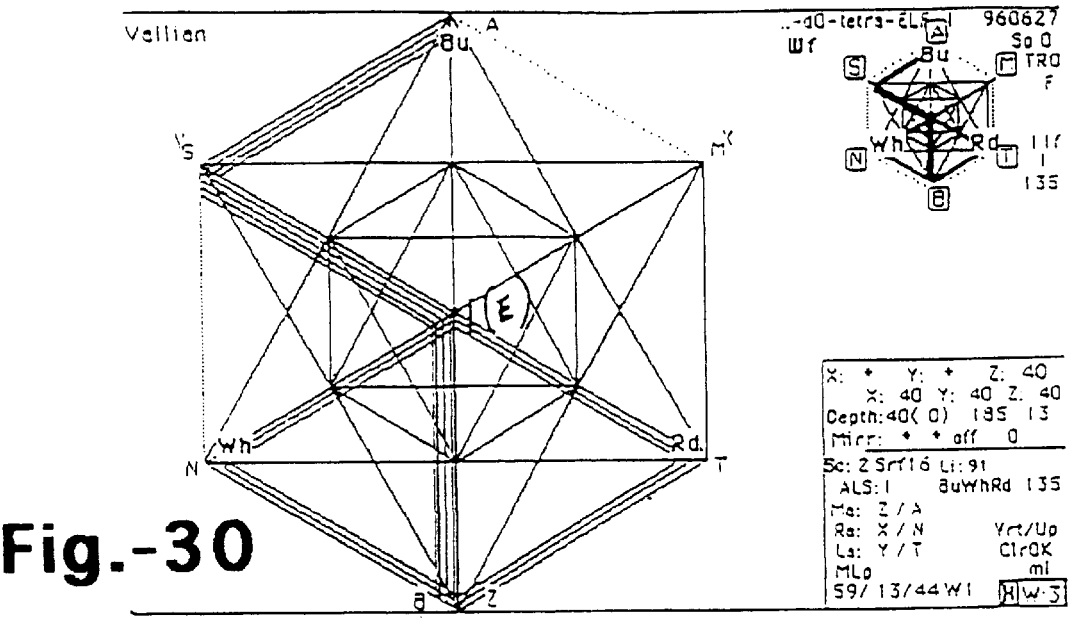

FIG. 30 Is an isometric graphic of a V/GHOST cube in the default position. This view shows a typical screen with the Beezul showing in the upper right-hand portion of the screen and a trace Data box showing in the lower right hand corner. The Beezul and the Data box can be individually ordered on or off the screen. The Beezul is a standard operating unit of the system, but the Data box at present is used more for tracing and testing of the source code. The purpose of the Beezul is to help the operator keep a sense of location as the operator is moving from one view to another. The main purpose of the Data box(not yet fully implemented)is to keep the relative and absolute pixel locations of any object available for the operator. To that end, noting the Data box in FIG. 30, we see in the first line an X* Y* and Z 40. This indicates that the cursor was located at PIXEL LOCATIONS X=185 (in the 3rd line) and 13=Y. The Z value is at 40.

The second line indicates that the CURSOR LOCATIONS(Vallian numbers) which are X 40 Y 40 Z 40.

Another line down, indicates that the MIRROR and its position are in the off mode, at a position just above the middle separation line. Just below this line we see Sc: 2 as a scale index, followed by the Srf 16(surfaces in skaff form) and Li:91(lines), as the number of non-duplicated lines which make up the figures.

ALS stands for ALICE and is followed by the letter I which indicates I(identity) is located there.

BuWhRd stands for the faces showing, namely, Blue, White, and Red. These color faces are always started with the control surface and work counter clockwise.

The 3 index number which ends this line is the description in order, from one to six of the visible locations of the faces.

Ma:Z/A indicates the Z diagonal vector is located at A as the control surface: The Ra:X/N indicates the X vector is located at N, and finally; the La:Y/T indicates that the y vector is located at T. V/GHOST there are four basic views available. The Ortho views, as well as the ISO views provide x, y, and z mirrors available.

In the next line is a constantly changing index which indicates the particular program loop the code is going through. In this case it represents the MLp mi (Main Loop main index)

Vrt/Up indicates that the cube will show a Blue or top view

ClrOk(clear/o.k.) indicates that there is no pending operation, or loop active. The last line deals with memory and their locations, while a separate box is shown as X}W:3 as an emergency escape control written into the code.

Figure 31:
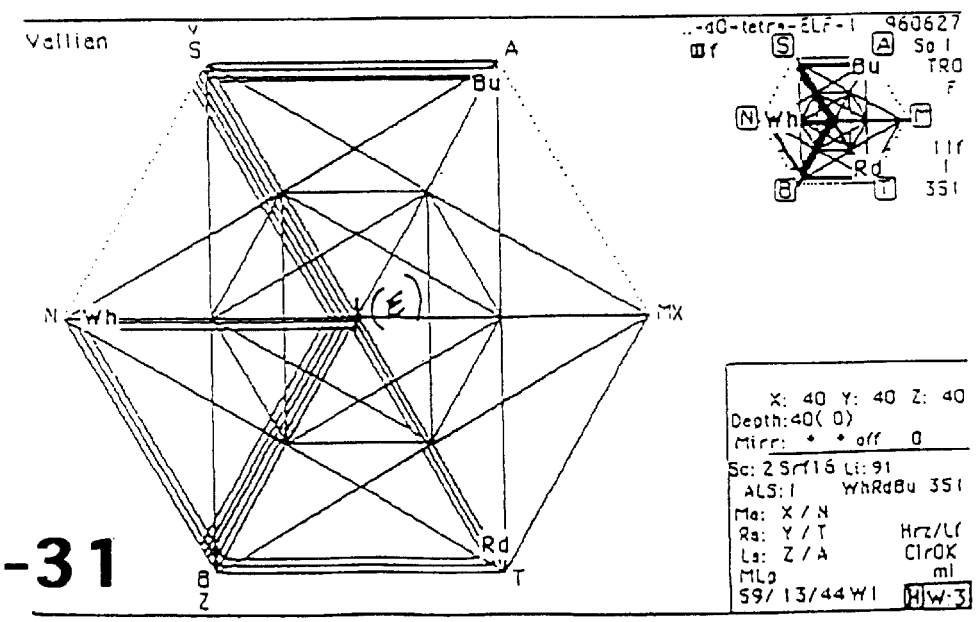

FIG. 31 Shows the Graphic display of FIG. 30 turned 30 degrees Spin Rotation clock-wise with the Beezul and the Data-box showing the relative changes.

As has been shown previously, there is no position the cube can be set to that does not have a control plane showing. This being the case, whenever an orthographic view is selected, the orthographic "top" view will automatically be of that selected control plane. Until the close of a session, whichever primary ISO view is active will determine the 'plan' view shown. Here, in FIG. 31, the Control Surface has moved from Up/Blue to Left/White.

This heuristic, canonical structure means that there are 24 basic orthographic views, controlled by the choice of ISO view. In the present case, the plan view is of the default position, i.e.. SAMNBTIE, with Blue, White, and Red showing. Thus, it can be seen that in any standard Isometric view, three orthographic views, and one isometric view, all drawn from the same, simple data-base. Although besides Plan listed in the Ortho Menu are Profile and Bulkhead, but, these terms are relevant only to the particular plan view which has been chosen, either from the primary ISO view, or from a related Ortho view.

Sheet 17 of 22

Figure 32:
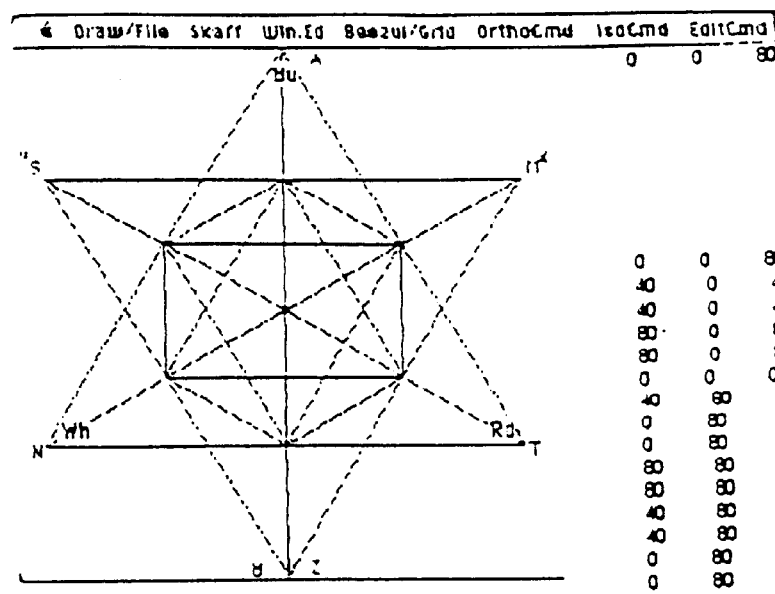

FIG. 32 shows a centrally located computer output of a Vallian application as a Star-of-David(actually a Star-Tetrahedron). On the left is a first set of numbers representing data-file headers, followed by the first of a data-base set of triples. On the right side of the FIG. 32 is a continuing set of points which make up the complete data-base for this drawn object.

Sheet 18 of 22

FIG. 33 Shows the first three menus at the top of the Vallian application output screen.

FIG. 34 Shows the remaining four menus, reading from left to right at the top of the Vallian application output screen.

Sheet 19 of 22

FIG. 35 Shows in an automated command form, the menus presently available, and the codes for accessing them.

Sheet 20 of 22

FIG. 36 Shows the continuing command form for the menu selection.

Sheet 21 of 22

FIG. 37 Shows a stretch out view of a do-decca-hedron, with letters representing the six colors of the cube faces, i.e.. White, Blue, Red, Yellow, Green, and Tan.

Sheet 22 of 22

Figure 38:
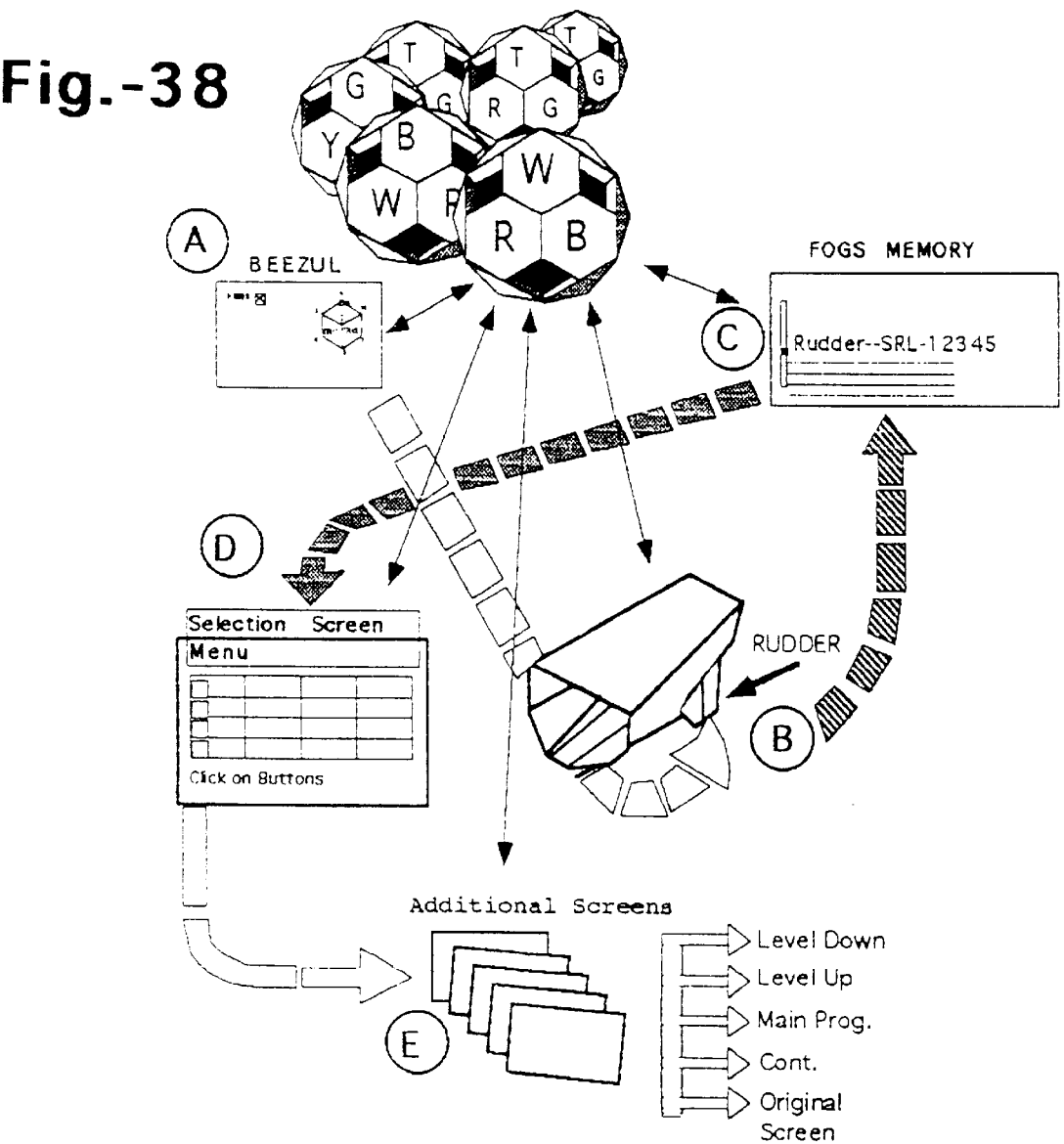

FIGS. 38.A, B, C, D, E Shows a Vallian Actual Object (VOB) view of a series of a do-decca-hedron, representing a 3-D object acting as Figure Order Grant Sphere of data-base auxiliary data and command lines.

Description of FOGS

A simple triangular approach inherent in the V/GHOST system easily provides 'hidden line' separations and clusters of FOGS numerical data packed around and attached to each virtually infinite locus descriptor, locking in color and shadow data to compliment each specific locus.

Because every point is specific to an object and the V/GHOST operates only with 'real' objects there are always five data points necessary for the description of a virtual profile, which then must have a necessary length attached to that profile, in order to make it something that will have enough substance to be 'real', in a real world. For example, the simplest 'object' done in a kind of non-permanent scaffolding (skaff)would call for a center and a radius, producing a circular section, which would then become real' only when a 'real length and width' was added to the information that specified it; a coin has center and radius but only some width will make it a real object.

There would be some exceptions to this rule in the case of spherical solid objects(which would only have a center and a diameter. Most V/GHOST 'objects' would have at least 5 data points to uniquely describe them. In the case of a coin, there would have to be another side(with its center and radius,) as well as the width of the coin to fully describe it as an object. The result of the foregoing is that if LAN (local area networks) are dealing with sub-assemblies of a master station's data, and the master station has an object ordered as a firewall indicated at a specific V/GHOST location, an operator on such a remote system LAN as described, will get an immediate "interference" if the operator attempts to push some instrument through the firewall to occupy space already taken up in the master drawing (two actual objects cannot occupy the same space), UNLESS specifically ordered by FOGS spherical cluster data for machining, movement, welding, or other characteristics.

Consideration of Spheres

In mathematical format, there exists a useful algorithm for a measurable world, a spherical virtual globe. This system, fully active and responsive, with proper navigational mechanics can locate any spot on the sphere Earth to within a few feet. It is the purpose of the V/GHOST system to combine the concept of this latitudinal/longitudinally-constructed, virtual sphere with the equally mathematically-perfect mechanics of the so-called Hypercube, or Tesseract. (Sheet 5, FIG. 7)

When this is accomplished by means of computer mechanics, the two systems can become one by making the diagonal of a Vallian cube equal to the diameter of a circumscribing earth-measured sphere. Planar products of x and y pixel locations can be multiplied by the square root of 3, divided by that result to obtain a cube whose diagonal is equal to the diameter of the sphere, and the edges of the inscribed cube will equal the ½ square root of 3 and can be declared to be the length of 1, or unity. Each edge of the cube is equal to the radius of the sphere, thereby locking the values of both the edge of the cube and the radius of the sphere to one half the square root of 3.

In practical terms, it is possible to have an isometric planar hexagon, viewed as a cube, produce edges equal to 1. Pixel raster product values (x,y) of the edges of the default view of the described cube can, for convenience, be made to add up to x=80, y=80, and z=80 for a total of 512,000 cubic Vallian integer points. With the use of sub-cubes and super-cubes of the original, mathematically-infinite scaling in both maxima and minima can be possible.

Utilizing this list in the programming means that the exact relationship of the cube can be tracked by a "look up table" containing sets of only 3 unit variables per position. The orthogonal views will be controlled by this same information, in that in all 24 cases of the orthogonal plan views will have their orientation determined by the isometric color and attendant location of a control surface.

The V/GHOST reaches back into geometric works of antiquity, ie, Archimedes, Plato, and Euclid, in a line of experimentation, discovery, and invention up to and including Buckminster Fuller. In order to do this, the V/GHOST considers the relationship between two geometric entities: the cubo-octahedron and the special bi-stable form which results in a regular octahedron. A Quasi-Modal Geometry is used based on these two figures and their curious and particular relationship to one another. It can easily be shown that if a cubo-octahedronal model is formed with 24 equal length sticks and flexible joints between its vertices, 6 squares and 8 equilateral triangles are formed. Since the six squares' 90 degree joints, are flexible, the whole array has a wobble and "nervous" construction which R. Buckminster Fuller (ref. Sheet 8 Fig.) described as a "jitterbug." The connectors (rubber in this case) tying squares at their vertices, have only proximating force on the sticks, not directive, thus the whole array can be manipulated into hundreds of ubiquitous forms.

In spite of this innate fluidity, and because the eight included triangles remain unalterable, something very strange happens when any of two opposing, triangles are pressed toward the center of the array: The squares, having no integral strength, all collapse simultaneously into one of two bi-stable double-sticked octahedrons.

The Default Views

The view of a default isometric cube shows the octahedron as a forward, upper, central cube in a potential 8-cube array, but when the external cube view is rotated 90 degrees by Vallian application-table rotation, the octahedronal "cube" maintains its position. In a sensible Cartesian octet, this central figure would move with each rotation, but in the Vallian application output, it maintains its apparent forward position. If the larger cube is turned, and the inner "cube" does not change its relative location, then, it obviously, that it is not part of the real 3-dimensional cube in which it appears to reside. Further, the octa-hedronal structure forms a base for each of 8 tetrahedrons which form the outside cube whose connecting vertices produce the vertices of the outside cube. Thus, the mechanics of a system with three, mutually perpendicular surfaces (necessary for 3-dimensional coordinate systems) can be exploited while its reality can be denied, providing a usable figure, which does in fact, not exist. This is the general description of V/GHOST.

SUMMARY

The VALLIAN/GEOMETRIC HEXAGON OPTING SYMBOLIC TESSERACT "V/GHOST" produces a poly-articulated field. Changes in position, appear and disappear with intuitive user input. Proven drafting table techniques open up an arena of artistic and engineering possibilities, which include, but are not limited to:

Generating a super Tesseract base whose nature is consistent and completely viable in all mathematical and geometric terms.

Solving all problems of ambiguity and paradox in 3-D viewing.

Providing an immediate, completely graphic capability for mensuration, while providing for numerical input, if desired.

Providing stable, absolute grids in 2-D, 3-D, or n-D. w

Allowing the user to operate within an expanded and, therefore, visualized, externalized cube, negating any user sense of claustrophobia or confusion.

Allowing the user to pitch, rotate, or spin any object through more than 300 V/GHOST views.

Providing the user with a universal and infinite scale.

Operating at unity so all that is necessary for automatic numerical scaling is positive or negative scalar input.

Tracking operations and/or objects in one coordinate system, while tracking that object's conditional, or implicit data, in the same or in another coordinate system.

I claim:

1. A data-stream manipulative translator method, for the computer, constructed for graphically and mathematically manipulating a Vallian/Geometric Hexagon Opting Symbolic Tesseract, comprising:

(a) a method which accepts general input data from which all pertinent mathematical and corollary data-base material is indexed, extracted, and displayed using;

(b) a non-Cartesian system which has three, mutually perpendicular, axial surfaces creating a usable, mensurable space figure which, in fact, does not exist in normal 3 dimensional space;

(c) which said system is locked to a virtual internal pegs based on integer locations which allow for common indexing of multiple attached features and added characteristics, whereby;

(d) a said Vallian/Geometric Hexagon Opting Symbolic Tesseract computer method enables the user to interface and interphase with AI, graphics, data-base, engineering systems, architectural detail, systems analysis, note-taking, CAD/CAM, and internet type communications systems.

* * * * *